(12) United States Patent
Nawata et al.

(10) Patent No.: US 9,821,795 B2
(45) Date of Patent: Nov. 21, 2017

(54) HYBRID VEHICLE AND CONTROL METHOD FOR HYBRID VEHICLE

(71) Applicant: TOYOTA JIDOSHA KABUSHIKI KAISHA, Toyota-shi, Aichi-ken (JP)

(72) Inventors: Hidekazu Nawata, Gotemba (JP); Tsukasa Abe, Gotemba (JP); Toshio Inoue, Gotemba (JP); Keita Fukui, Fujinomiya (JP); Tomoaki Honda, Gotemba (JP); Yuta Niwa, Mishima (JP); Taichi Osawa, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/114,192

(22) PCT Filed: Jan. 26, 2015

(86) PCT No.: PCT/IB2015/000071
§ 371 (c)(1),
(2) Date: Jul. 26, 2016

(87) PCT Pub. No.: WO2015/114441
PCT Pub. Date: Aug. 6, 2015

(65) Prior Publication Data
US 2016/0368483 A1     Dec. 22, 2016

(30) Foreign Application Priority Data

Jan. 28, 2014   (JP) .................................. 2014-013226

(51) Int. Cl.
*B60K 6/44*     (2007.10)
*B60W 10/06*    (2006.01)
(Continued)

(52) U.S. Cl.
CPC ............... *B60W 20/16* (2016.01); *B60K 6/44* (2013.01); *B60K 6/445* (2013.01); *B60W 10/06* (2013.01);
(Continued)

(58) Field of Classification Search
CPC ...... B60W 20/16; B60W 20/13; B60W 20/40; B60W 10/06; B60W 10/08; B60W 10/26;
(Continued)

(56) References Cited

U.S. PATENT DOCUMENTS 6,427,793 B1     8/2002  Hanada et al.
2006/0218903 A1  10/2006 Ogata
(Continued)

FOREIGN PATENT DOCUMENTS

CN   102822029 A   12/2012
FR   2 805 222 A1   8/2001
(Continued)

*Primary Examiner* — Marthe Marc-Coleman
(74) *Attorney, Agent, or Firm* — Finnegan, Henderson, Farabow, Garrett & Dunner, LLP

(57) ABSTRACT

A hybrid vehicle includes an engine, a rotary electric machine, a filter and an ECU. The engine includes an exhaust passage. The rotary electric machine is a driving source of the vehicle. The filter traps particulate matter flowing through the exhaust passage. The ECU is configured to control the hybrid vehicle in any one of a plurality of control modes. The plurality of control modes include a first control mode and a second control mode. The number of opportunities for the engine to operate when the control mode is the second control mode is larger than the number of opportunities for the engine to operate when the control mode is the first control mode. The ECU is configured to, when the filter is regenerated, control the hybrid vehicle in the second control mode.

10 Claims, 15 Drawing Sheets

(51) Int. Cl.
*B60W 10/08* (2006.01)
*B60W 10/26* (2006.01)
*B60W 20/16* (2016.01)
*B60W 20/13* (2016.01)
*B60K 6/445* (2007.10)
*B60W 20/40* (2016.01)

(52) U.S. Cl.
CPC ............ *B60W 10/08* (2013.01); *B60W 10/26* (2013.01); *B60W 20/13* (2016.01); *B60W 20/40* (2013.01); *B60W 2510/244* (2013.01); *B60W 2520/10* (2013.01); *B60W 2530/12* (2013.01); *B60W 2710/244* (2013.01); *B60Y 2200/92* (2013.01); *B60Y 2300/476* (2013.01); *Y02T 10/54* (2013.01); *Y02T 10/6239* (2013.01); *Y02T 10/6286* (2013.01); *Y10S 903/93* (2013.01)

(58) Field of Classification Search
CPC ....... B60W 2510/244; B60W 2520/10; B60W 2530/12; B60W 2710/244; B60K 6/44; B60K 6/445; B60Y 2200/92; B60Y 2300/476; B02T 10/54; B02T 10/6239; B02T 10/6286; Y10S 903/93

USPC ............... 701/22; 180/65.21, 65.23; 903/903
See application file for complete search history.

(56) References Cited

U.S. PATENT DOCUMENTS

| | | | |
|---|---|---|---|
| 2010/0145560 A1 | 6/2010 | Komatsu et al. | |
| 2012/0310458 A1 | 12/2012 | Nawata et al. | |
| 2013/0204476 A1 | 8/2013 | Zink et al. | |
| 2014/0114512 A1* | 4/2014 | Treharne ............... | B60W 10/04 701/22 |

FOREIGN PATENT DOCUMENTS

| | | |
|---|---|---|
| JP | 2001-115869 | 4/2001 |
| JP | 2005-36659 | 2/2005 |
| JP | 2005-48617 | 2/2005 |
| JP | 2007-230409 | 9/2007 |
| JP | 2007-230475 | 9/2007 |
| JP | 2007-230476 | 9/2007 |
| JP | 2009-18713 | 1/2009 |
| JP | 2010-167941 | 8/2010 |
| JP | 2011085092 A | 4/2011 |
| JP | 2011-169203 | 9/2011 |
| WO | WO 2012/131941 A1 | 10/2012 |

* cited by examiner

HYBRID VEHICLE AND CONTROL METHOD FOR HYBRID VEHICLE

CROSS-REFERENCE TO RELATED APPLICATIONS

This application is a national phase application of International Application No. PCT/IB2015/000071, filed Jan. 26, 2015, and claims the priority of Japanese Application No. 2014-013226, filed Jan. 28, 2014, the content of both of which is incorporated herein by reference.

BACKGROUND OF THE INVENTION

1. Field of the Invention

The invention relates to a hybrid vehicle including a filter that traps particulate matter flowing through an exhaust passage of an engine.

2. Description of Related Art

There is a known hybrid vehicle on which an internal combustion engine and an electric motor are mounted. The internal combustion engine is, for example, a gasoline engine or a diesel engine. Exhaust gas from these engines contains particulate matter (PM), so a filter, such as a diesel particulate filter (DPF) and a gasoline particulate filter (GPF), may be installed in an exhaust passage of each of the engines for the purpose of reducing the PM.

When PM accumulates in these filters, exhaust resistance increases. Therefore, regeneration control for burning the PM accumulated in the filters is executed by utilizing exhaust heat, or the like, of the engine at appropriate timing.

In the hybrid vehicle, there is known that the vehicle is controlled in accordance with any one of a plurality of control modes having different numbers of opportunities for the engine to operate. For example, International Application Publication No. 2012/131941 describes a controller for a hybrid vehicle. The controller varies an engine start-up condition during a charge sustaining (CS) mode and an engine start-up condition during a charge depleting (CD) mode from each other.

SUMMARY OF THE INVENTION

Incidentally, the CD mode described in Internal Application Publication No. 2012/131941 has a smaller number of opportunities for the engine to operate than the CS mode, so the CD mode is a control mode in which the vehicle tends to travel in a state where the engine is stopped. Therefore, in a hybrid vehicle on which a filter for trapping PM is mounted, if regeneration control is executed over the filter during the CD mode, there is a case where the engine stops before regeneration of the filter completes and, as a result, regeneration of the filter does not complete.

The invention provides a hybrid vehicle and a control method for a hybrid vehicle, which reliably complete regeneration of a filter when a control mode having a smaller number of opportunities for an engine to operate is selected.

An aspect of the invention provides a hybrid vehicle. The hybrid vehicle includes an engine, a rotary electric machine, a filter and an ECU. The engine includes an exhaust passage. The rotary electric machine is a driving source of the vehicle. The filter is configured to trap particulate matter flowing through the exhaust passage. The ECU is configured to control the hybrid vehicle in any one of a plurality of control modes. The plurality of control modes include a first control mode and a second control mode. The number of opportunities for the engine to operate when the control mode is the second control mode is larger than the number of opportunities for the engine to operate when the control mode is the first control mode. The ECU is configured to control the hybrid vehicle in the second control mode when the filter is regenerated.

With this configuration, when the filter is regenerated, the vehicle is controlled in the second control mode having a larger number of opportunities for the engine to operate than the first control mode. Thus, it is possible to extend the operating time of the engine as compared to when the vehicle is controlled in the first control mode. Therefore, it is possible to reliably complete regeneration of the filter by increasing the temperature of the filter to a regeneratable temperature.

In the above aspect, the ECU may be configured to change the control mode of the hybrid vehicle from the first control mode to the second control mode when the control mode is the first control mode and when the filter is regenerated.

With this configuration, when the control mode is the first control mode and when the filter is regenerated, the control mode of the vehicle is changed from the first control mode to the second control mode. Thus, it is possible to increase the number of opportunities for the engine to operate as compared to when the control mode is the first control mode. Therefore, it is possible to extend the operating time of the engine as compared to when the control mode is the first control mode, so it is possible to reliably complete regeneration of the filter by increasing the temperature of the filter to the regeneratable temperature.

In the above aspect, the ECU may be configured to keep the second control mode until regeneration of the filter completes when the filter is regenerated and when the control mode is changed into the second control mode.

With this configuration, the second control mode is kept until regeneration completes, so it is possible to keep a state where there is a large number of opportunities for the engine to operate as compared to when the control mode is the first control mode. Therefore, it is possible to reliably complete regeneration of the filter by increasing the temperature of the filter to the regeneratable temperature.

In the above aspect, the ECU may be configured to change the control mode from the second control mode to the first control mode after regeneration of the filter has completed when the filter is regenerated and when the control mode is changed into the second control mode.

With this configuration, the control mode of the vehicle is changed into the first control mode after regeneration of the filter has completed. Thus, it is possible to return from a state where there is a large number of opportunities for the engine to operate to a state before regeneration of the filter is started. Therefore, it is possible to quickly eliminate the state where there is a large number of opportunities for the engine to operate although a user recognizes that the first control mode is selected.

In the above aspect, the hybrid vehicle may further include an electrical storage device. The electrical storage device is configured to be charged by using a power of the engine. The ECU may be configured to change the control mode from the second control mode to the first control mode when regeneration of the filter completes and when a state of charge of the electrical storage device is higher than or equal to a predetermined value. The ECU may be configured to keep the second control mode when regeneration of the filter completes and when the state of charge is lower than the predetermined value.

With this configuration, it is possible to change the control mode of the vehicle into the first control mode when regeneration of the filter has completed and when the state of charge of the electrical storage device is higher than or equal to the predetermined value. In this way, it is possible to return a state where there is a large number of opportunities for the engine to operate to a state before regeneration of the filter is started. It is possible to keep the second control mode when regeneration of the filter has completed and when the SOC of the electrical storage device is lower than the predetermined value. Thus, it is possible to suppress a decrease in the state of charge of the electrical storage device.

In the above aspect, the ECU may be configured to change the control mode from the first control mode to the second control mode after the engine has been started up when the control mode is the first control mode and when regeneration of the filter is required.

With this configuration, when regeneration of the filter is required, the control mode of the vehicle is changed into the second control mode after the engine is started up. In this way, it is possible to increase the number of opportunities for the engine to operate as compared to when the control mode is the first control mode. Therefore, it is possible to reliably complete regeneration of the filter by increasing the temperature of the filter to the regeneratable temperature.

In the above aspect, the ECU may be configured to start up the engine when the control mode is the first control mode and when a power of the hybrid vehicle exceeds a first start-up threshold. The ECU may be configured to start up the engine when the control mode is the second control mode and when the power of the hybrid vehicle exceeds a second start-up threshold. The second start-up threshold is a value lower than the first start-up threshold.

With this configuration, because the second start-up threshold is lower than the first start-up threshold, it is possible to increase the number of opportunities for the engine to operate when the control mode is the second control mode as compared to the number of opportunities for the engine to operate when the control mode is the first control mode.

In the above aspect, the ECU may be configured to start up the engine when the control mode is the first control mode and when a speed of the vehicle exceeds a third start-up threshold. The ECU may be configured to start up the engine when the control mode is the second control mode and when the speed of the vehicle exceeds a fourth start-up threshold. The fourth start-up threshold is a value lower than the third start-up threshold.

With this configuration, because the second start-up threshold is lower than the first start-up threshold, it is possible to increase the number of opportunities for the engine to operate when the control mode is the second control mode as compared to the number of opportunities for the engine to operate when the control mode is the first control mode.

In the above aspect, the engine may be a gasoline engine. The gasoline engine is smaller in the amount of PM generated than a diesel engine having a comparable power, and may be permitted to temporarily stop the engine even when regeneration of the filter is required as compared to a diesel engine. Therefore, as a result of a change of the control mode into the second control mode, the number of opportunities for the engine to operate is increased, and it is possible to reliably complete regeneration of the filter by increasing the temperature of the filter to the regeneratable temperature.

Another aspect of the invention provides a control method for a hybrid vehicle. The hybrid vehicle includes an engine, a rotary electric machine, a filter and an ECU. The engine includes an exhaust passage. The rotary electric machine is a driving source of the hybrid vehicle. The filter is configured to trap particulate matter flowing through the exhaust passage. The control method includes controlling, by the ECU, the hybrid vehicle in any one of a plurality of control modes. The plurality of control modes include a first control mode and a second control mode. The number of opportunities for the engine to operate when the control mode is the second control mode is larger than the number of opportunities for the engine to operate when the control mode is the first control mode. The control method includes, controlling, by the ECU, the hybrid vehicle in the second control mode when the filter is regenerated.

According to the invention, when the filter is regenerated, the vehicle is controlled in the second control mode having a larger number of opportunities for the engine to operate than the first control mode. Thus, it is possible to extend the operating time of the engine as compared to when the vehicle is controlled in the first control mode. Therefore, it is possible to reliably complete regeneration of the filter by increasing the temperature of the filter to a regeneratable temperature. Thus, it is possible to provide the hybrid vehicle and the control method for a hybrid vehicle, which reliably complete regeneration of the filter in the case where the control mode having a smaller number of opportunities for the engine to operate is selected.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
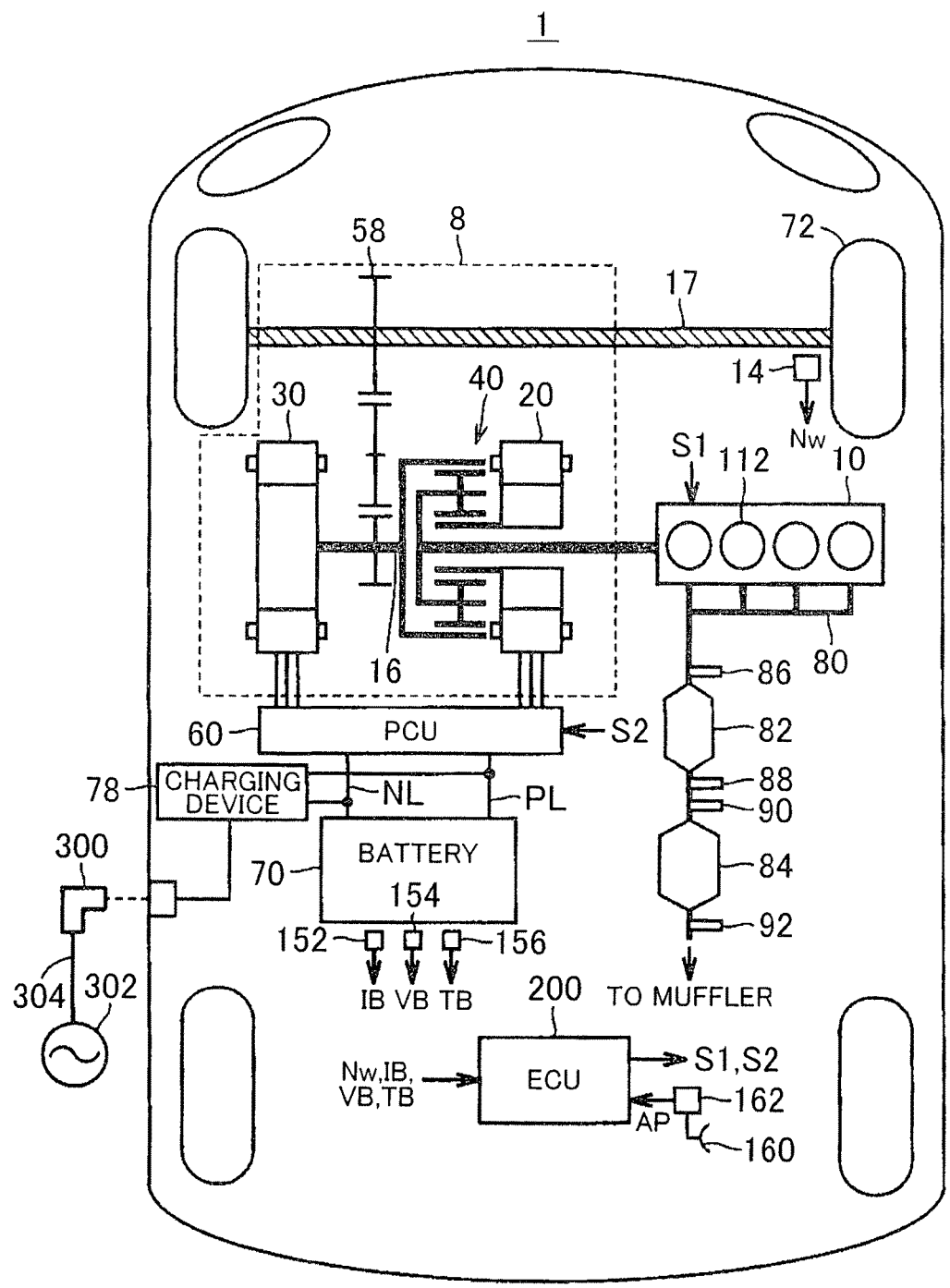
FIG. 1 is an overall block diagram of a vehicle.

Hereinafter, embodiments of the invention will be described with reference to the accompanying drawings. In the following description, like reference numerals denote the same components. The names and functions of the corresponding components are also the same. Thus, the detailed description of the corresponding components will not be repeated.

A first embodiment will be described as following. The overall block diagram of a hybrid vehicle 1 (hereinafter, simply referred to as vehicle 1) according to the present embodiment will be described with reference to FIG. 1. The vehicle 1 includes a transmission 8, an engine 10, a drive shaft 17, a power control unit (PCU) 60, a battery 70, drive wheels 72, a charging device 78, an accelerator pedal 160, and an electronic control unit (ECU) 200.

The transmission 8 includes an output shaft 16, a first motor generator (hereinafter, referred to as first MG) 20, a second motor generator (hereinafter, referred to as second MG) 30, a power split device 40, and a reduction gear 58.

The engine 10 includes a plurality of cylinders 112. One end of an exhaust passage 80 is coupled to the engine 10. The other end of the exhaust passage 80 is coupled to a muffler (not shown). A catalyst 82 and a filter 84 are provided in the exhaust passage 80.

A wheel speed sensor 14, an air-fuel ratio sensor 86, an oxygen sensor 88, an upstream-side pressure sensor 90, a downstream-side pressure sensor 92, a current sensor 152, a voltage sensor 154, a battery temperature sensor 156 and a pedal stroke sensor 162 are connected to the ECU 200 so that the ECU 200 is able to receive various signals from the sensors.

The thus configured vehicle 1 travels by using driving force that is output from at least one of the engine 10 or the second MG 30. Power that is generated by the engine 10 is split by the power split device 40 into two paths. One of the two paths is a path through which power is transmitted to the drive wheels 72 via the reduction gear 58. The other one of the two paths is a path through which power is transmitted to the first MG 20.

The first MG 20 and the second MG 30 each are, for example, a three-phase alternating-current rotary electric machine. The first MG 20 and the second MG 30 are driven by the PCU 60.

The first MG 20 has the function of a generator (power generating device) that generates electric power by using power split from the power of the engine 10 by the power split device 40 and then charges the battery 70 via the PCU 60. The first MG 20 rotates a crankshaft upon reception of electric power from the battery 70. The crankshaft is an output shaft of the engine 10. Thus, the first MG 20 has the function of a starter that starts up the engine 10.

The second MG 30 has the function of a drive motor that provides driving force to the drive wheels 72 by using at least one of electric power stored in the battery 70 or electric power generated by the first MG 20. The second MG 30 has the function of a generator for charging the battery 70 via the PCU 60 by using electric power generated by regenerative braking.

The engine 10 is a gasoline engine, and is controlled on the basis of a control signal S1 from the ECU 200.

In the present embodiment, the engine 10 includes four cylinders 112, that is, the first cylinder to the fourth cylinder. An ignition plug (not shown) is provided at each of top portions inside the plurality of cylinders 112.

The engine 10 is not limited to an in-line four-cylinder engine as shown in FIG. 1. For example, the engine 10 may be an engine of any type, formed of a plurality of cylinders or a plurality of banks, such as an in-line three-cylinder engine, a V six-cylinder engine, a V eight-cylinder engine, an in-line six-cylinder engine, a horizontally-opposed four-cylinder engine and a horizontally-opposed six cylinder engine.

The engine 10 includes fuel injection devices (not shown) corresponding to the plurality of cylinders 112. The fuel injection devices may be respectively provided in the plurality of cylinders 112 or may be respectively provided in intake ports of the cylinders.

In the thus configured engine 10, the ECU 200 controls a fuel injection amount to each of the plurality of cylinders 112 by injecting fuel in an appropriate amount at appropriate timing to each of the plurality of cylinders 112 or stopping injection of fuel to each of the plurality of cylinders 112.

The catalyst 82 provided in the exhaust passage 80 oxidizes unburned components contained in exhaust gas that is emitted from the engine 10, or reduces oxidized components. Specifically, the catalyst 82 has occluded oxygen, and oxidizes unburned components, such as HC and CO, by using occluded oxygen when the unburned components are contained in exhaust gas. When oxidized components, such as NOx, are contained in exhaust gas, the catalyst 82 is able to reduce the oxidized components and occlude released oxygen. Therefore, the percentage of nitrogen dioxide ($NO_2$) contained in exhaust gas increases because of the catalyst 82.

The filter 84 is arranged at a location downstream of the catalyst 82 in the exhaust passage 80. The filter 84 is a GPF. The filter 84 may have a similar function to that of the catalyst 82. In such a case, the catalyst 82 may be omitted. The filter 84 may be arranged at a location upstream of the catalyst 82 in the exhaust passage 80. The filter 84 traps particulate matter (PM) contained in exhaust gas. Trapped PM accumulates in the filter 84.

The air-fuel ratio sensor 86 is provided at a location upstream of the catalyst 82 in the exhaust passage 80. The oxygen sensor 88 is provided at a location downstream of the catalyst 82 and upstream of the filter 84 in the exhaust passage 80.

The air-fuel ratio sensor 86 is used to detect the air-fuel ratio of air-fuel mixture, that is, a mixture of fuel and air, which is supplied to each of the plurality of cylinders 112. The air-fuel ratio sensor 86 detects the air-fuel ratio in exhaust gas, and transmits a signal indicating the detected air-fuel ratio to the ECU 200.

The oxygen sensor 88 is used to detect the concentration of oxygen in air-fuel mixture, that is, a mixture of fuel and air, which is supplied to each of the plurality of cylinders 112. The oxygen sensor 88 detects the concentration of oxygen in exhaust gas, and transmits a signal indicating the detected concentration of oxygen to the ECU 200. The ECU 200 calculates the air-fuel ratio on the basis of the received signal.

The upstream-side pressure sensor 90 is provided at a location upstream of the filter 84 and downstream of the oxygen sensor 88 in the exhaust passage 80. The downstream-side pressure sensor 92 is provided at a location downstream of the filter 84 in the exhaust passage 80.

Each of the upstream-side pressure sensor 90 and the downstream-side pressure sensor 92 is used to detect the pressure in the exhaust passage 80. The upstream-side pressure sensor 90 transmits a signal (first pressure detection signal) indicating the detected pressure in the exhaust passage 80 (upstream-side pressure) to the ECU 200. The downstream-side pressure sensor 92 transmits a signal (second pressure detection signal) indicating the detected pressure in the exhaust passage 80 (downstream-side pressure) to the ECU 200.

The power split device 40 is configured to be able to split power, which is generated by the engine 10, into a path toward the drive shaft 17 via the output shaft 16 and a path toward the first MG 20. The power split device 40 may be formed of a planetary gear train. The planetary gear train includes three rotary shafts, that is, a sun gear, a planetary gear and a ring gear. For example, the rotor of the first MG 20 is connected to the sun gear, the output shaft of the engine 10 is connected to the planetary gear, and the output shaft 16 is connected to the ring gear. Thus, the engine 10, the first MG 20 and the second MG 30 are allowed to be mechanically connected to the power split device 40.

The output shaft 16 is also connected to the rotor of the second MG 30. The output shaft 16 is mechanically coupled to the drive shaft 17 via the reduction gear 58. The drive shaft 17 is used to rotationally drive the drive wheels 72. A transmission may be further assembled between the rotary shaft of the second MG 30 and the output shaft 16.

The PCU 60 converts direct-current power, which is supplied from the battery 70, to alternating-current power, and drives the first MG 20 and the second MG 30. The PCU 60 converts alternating-current power, generated by the first MG 20 or the second MG 30, to direct-current power, and charges the battery 70. For example, the PCU 20 includes an inverter (not shown) and a converter (not shown). The inverter is used to convert between direct-current power and alternating-current power. The converter is used to convert direct-current voltage between a direct-current link side of the inverter and the battery 70.

The battery 70 is an electrical storage device, and is a rechargeable direct-current power supply. The battery 70 includes, for example, a nickel-metal hydride secondary battery or a lithium ion secondary battery. The voltage of the battery 70 is, for example, about 200 V. Not only the battery 70 is charged with electric power generated by the first MG 20 and/or the second MG 30 as described above but also the battery 70 may be charged with electric power that is supplied from an external power supply (not shown). The battery 70 is not limited to a secondary battery. The battery 70 may be the one that is able to generate direct-current voltage, and may be, for example, a capacitor, a solar cell, a fuel cell, or the like. The vehicle 1 may be equipped with a charging device that allows the battery 70 to be charged with the use of an external power supply.

The current sensor 152, the voltage sensor 154 and the battery temperature sensor 156 are provided at the battery 70. The current sensor 152 detects the current IB of the battery 70. The current sensor 152 transmits a signal indicating the current 1B to the ECU 200. The voltage sensor 154 detects the voltage VB of the battery 70. The voltage sensor 154 transmits a signal indicating the voltage VB to the ECU 200. The battery temperature sensor 156 detects the battery temperature TB of the battery 70. The battery temperature sensor 156 transmits a signal indicating the battery temperature TB to the ECU 200.

The ECU 200 estimates a state of charge (hereinafter, referred to as SOC) of the battery 70 on the basis of the current 1B, voltage VB and battery temperature TB of the battery 70. The ECU 200 may estimate an open circuit voltage (OCV) on the basis of, for example, the current, the voltage and the battery temperature and then estimate the SOC of the battery 70 on the basis of the estimated OCV and a predetermined map. Alternatively, the ECU 200 may estimate the SOC of the battery 70 by, for example, integrating a charge current of the battery 70 and a discharge current of the battery 70.

The charging device 78 charges the battery 70 with electric power that is supplied from an external power supply 302 when a charging plug 300 is attached to the vehicle 1 during a stop of the vehicle 1. The charging plug 300 is connected to one end of a charging cable 304. The other end of the charging cable 304 is connected to the external power supply 302. The positive electrode terminal of the charging device 78 is connected to a power supply line PL. The power supply line PL connects the positive electrode terminal of the PCU 60 to the positive electrode terminal of the battery 70. The negative electrode terminal of the charging device 78 is connected to a ground line NL. The ground line NL connects the negative electrode terminal of the PCU 60 to the negative electrode terminal of the battery 70. In addition to or instead of a charging method in which electric power is supplied from the external power supply 302 to the battery 70 of the vehicle 1 through contact power supply using the charging plug 300, and the like, a charging method in which electric power is supplied from the external power supply 302 to the battery 70 of the vehicle 1 through contactless power supply, such as a resonance method and electromagnetic induction, may be used.

The wheel speed sensor 14 detects the rotation speed Nw of one of the drive wheels 72. The wheel speed sensor 14 transmits a signal indicating the detected rotation speed Nw to the ECU 200. The ECU 200 calculates a vehicle speed V on the basis of the received rotation speed Nw. The ECU 200 may calculate the vehicle speed V on the basis of the rotation speed Nm2 of the second MG 30 instead of the rotation speed Nw.

The accelerator pedal 160 is provided at a driver seat. The pedal stroke sensor 162 is provided at the accelerator pedal 160. The pedal stroke sensor 162 detects a stroke (depression amount) AP of the accelerator pedal 160. The pedal stroke sensor 162 transmits a signal indicating the stroke AP to the ECU 200. Instead of the pedal stroke sensor 162, an accelerator pedal depression force sensor may be used. The accelerator pedal depression force sensor is used to detect the depression force exerted on the accelerator pedal 160 by an occupant of the vehicle 1.

The ECU 200 generates a control signal S1 for controlling the engine 10, and outputs the generated control signal S1 to the engine 10. The ECU 200 generates a control signal S2 for controlling the PCU 60, and outputs the generated control signal S2 to the PCU 60.

The ECU 200 is a controller that controls an overall hybrid system, that is, the charge/discharge state of the battery 70 and the operating states of the engine 10, first MG 20 and second MG 30, so that the vehicle 1 is able to operate at the highest efficiency through control over the engine 10, the PCU 60, and the like.

The ECU 200 calculates a required vehicle power corresponding to the stroke AP of the accelerator pedal 160 and the vehicle speed V. The accelerator pedal 160 is provided at the driver seat. When an auxiliary is operated, the ECU 200 adds a power, required to operate the auxiliary, to the calculated required vehicle power. The auxiliary is, for example, an air conditioner. In addition, when the battery 70 is charged, the ECU 200 adds a power, required to charge the battery, to the calculated required vehicle power. The ECU 200 controls the torque of the first MG 20, the torque of the second MG 30 or the output of the engine 10 on the basis of the calculated required vehicle power. In the present embodiment, a configuration, including the transmission 8 and the PCU 60, corresponds to a power conversion device. The transmission 8 includes the first MG 20 and the second MG 30. The PCU 60 exchanges electric power with the first MG 20 or the second MG 30. The power conversion device is able to convert the power of the engine 10 to electric power for charging the battery 70, and is able to convert the electric power of the battery 70 to power for propelling the vehicle 1.

In the present embodiment, the ECU 200 controls the PCU 60 and the engine 10 in accordance with any one of control modes. The control modes include a mode (hereinafter, referred to as charge depleting (CD) mode) and a mode (hereinafter, referred to as charge sustaining (CS) mode). In the CD mode, the vehicle 1 travels by consuming electric power of the battery 70 without keeping the SOC of the battery 70. In the CS mode, the engine 10 is operated or stopped and the vehicle 1 travels while keeping the SOC of the battery 70. The CD mode is not specifically limited to not keeping the SOC, and may be, for example, a mode that gives a higher priority to traveling by consuming electric power of the battery 70 in an EV mode than to traveling while keeping the SOC of the battery 70. The control modes may include a control mode other than the CD mode or the CS mode. The control modes are not limited to control over the vehicle 1 while the vehicle 1 is traveling. The control modes are used in control over the vehicle 1 while the vehicle 1 is traveling or while the vehicle 1 is stopped.

The ECU 200, for example, automatically changes between the CD mode and the CS mode. For example, the ECU 200 controls the PCU 60 and the engine 10 in accordance with the CD mode when the SOC of the battery 70 is higher than a threshold SOC(1), and controls the PCU 60 and the engine 10 in accordance with the CS mode when the SOC of the battery 70 is lower than the threshold SOC(1). The ECU 200 may change between the CD mode and the CS mode in response to the fact that an operation member, such as a switch and a lever, is operated by a user in order to change the control mode.

While the vehicle 1 is traveling in accordance with the CD mode, because the operation of the engine 10 for power generation is suppressed (that is, because a decrease in the SOC of the battery 70 is permitted), the SOC of the battery 70 is not kept, electric power of the battery 70 is consumed in accordance with an increase in travel distance, and the SOC of the battery 70 decreases.

During the CD mode, the ECU 200 controls the PCU 60 so that the vehicle 1 travels by using only the output of the second MG 30 as long as a required vehicle power does not exceed a start-up threshold Pr(1) of the engine 10.

When the vehicle 1 is traveling by using only the output of the second MG 30 during the CD mode, after the required vehicle power exceeds the start-up threshold Pr(1) of the engine 10 (that is, after it is determined that the required vehicle power is not satisfied by only the output of the second MG 30), the ECU 200 starts up the engine 10, and controls the PCU 60 and the engine 10 so that the required vehicle power is satisfied by the output of the second MG 30 and the output of the engine 10. That is, the CD mode is a control mode in which the operation of the engine 10 for satisfying the required vehicle power is allowed although the operation of the engine 10 for power generation is suppressed. Instead of the required vehicle power, the engine 10 may be started up when an actual power of the vehicle 1 exceeds a start-up threshold of the engine 10. When the required vehicle power becomes lower than a stop threshold of the engine 10 during the CD mode, the ECU 200 stops the engine 10. The stop threshold during the CD mode is a predetermined value lower than or equal to the start-up threshold Pr(1).

When the vehicle 1 travels in accordance with the CS mode, the operation of the engine 10 for power generation is allowed, and a decrease in the SOC of the battery 70 is suppressed by keeping the SOC of the battery 70 or recovering the SOC of the battery 70.

For example, the ECU 200 may execute charge/discharge control over the battery 70 so that the SOC of the battery 70 falls within a predetermined control range (for example, a control range including the above-described threshold SOC (1)) during the CS mode or may execute charge/discharge control over the battery 70 so that the SOC of the battery 70 keeps a predetermined target SOC (for example, the above-described threshold SOC(1)).

Charge control over the battery 70 includes, for example, charge control that uses regenerated electric power that is generated through regenerative braking of the second MG 30 and charge control that uses electric power generated by the first MG 20 by using the power of the engine 10.

During the CS mode, when the SOC of the battery 70 significantly exceeds the predetermined control range or the predetermined target SOC, the ECU 200 controls the PCU 60 so that the vehicle travels by using only the output of the second MG 30 as long as the required vehicle power does not exceed a start-up threshold Pr(2) of the engine 10.

When the vehicle 1 is traveling by using only the output of the second MG 30 during the CS mode as described above, after the required vehicle power exceeds the start-up threshold Pr(2) of the engine 10 (that is, after it is determined that the required vehicle power is not satisfied by only the output of the second MG 30), the ECU 200 starts up the engine 10, and controls the PCU 60 and the engine 10 so that the required vehicle power is satisfied by both the output of the second MG 30 and the output of the engine 10. That is, the CS mode is a control mode in which the operation of the engine 10 for power generation or the operation of the engine 10 for satisfying the required vehicle power is allowed. When the required vehicle power becomes lower than a stop threshold of the engine 10 during the CS mode, the ECU 200 stops the engine 10. The stop threshold during the CS mode is a predetermined value lower than or equal to the start-up threshold Pr(2).

In the present embodiment, description will be made on the assumption that the start-up threshold Pr(1) during the CD mode is higher than the start-up threshold Pr(2) during the CS mode and the stop threshold during the CD mode is higher than the stop threshold during the CS mode. Each of the start-up thresholds Pr(1), Pr(2) is a value lower than or equal to an upper limit value of the output of the second MG 30 and lower than or equal to an upper limit value (Wow) of the output of the battery 70. With this configuration, as will be described below, there occurs a difference in opportunity for the engine 10 to operate between during the CD mode and during the CS mode.

Figure 2:
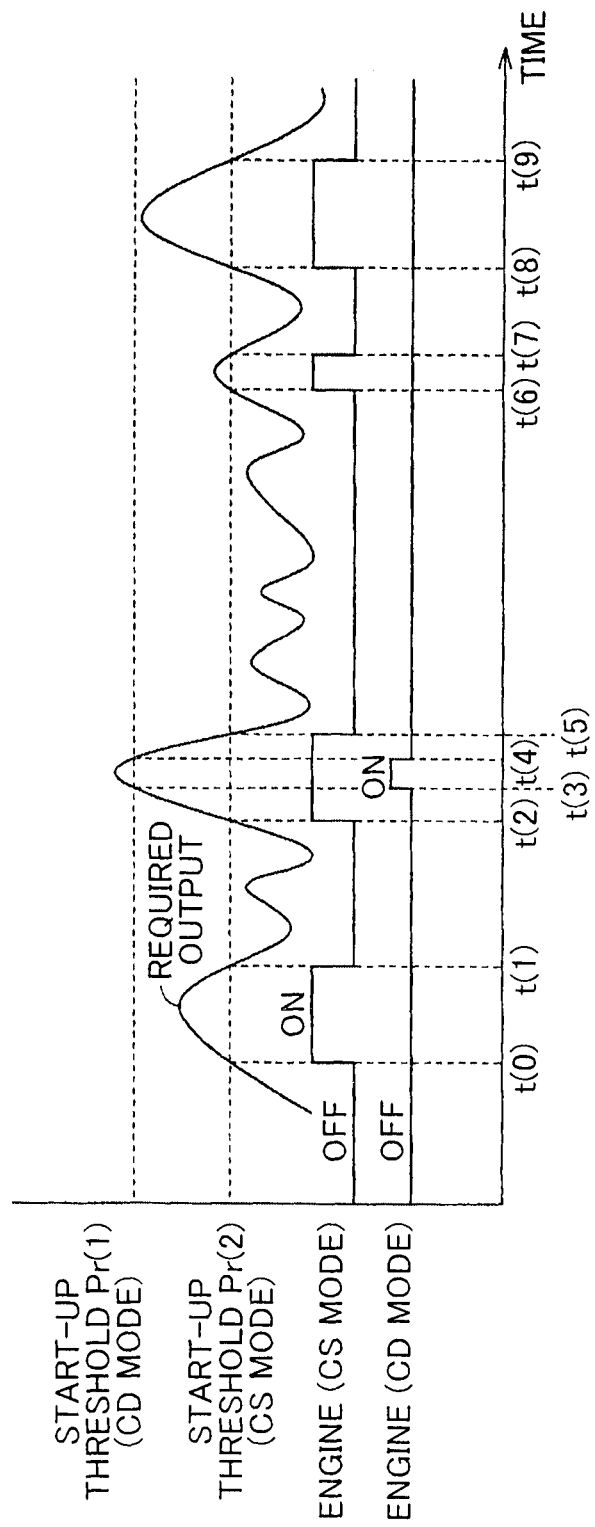
FIG. 2 is a timing chart for illustrating a difference in start-up frequency between control modes.

For example, as shown in FIG. 2, assuming the case where a required output of the vehicle 1 similarly changes during the CD mode and during the CS mode.

In this case, during the CS mode, in a period from time t(0) to time t(1), a period from time t(2) to time t(5), a period from time t(6) to time t(7) and a period from time t(8) to time t(9), the required output exceeds the start-up threshold Pr(2) of the engine 10, with the result that the engine 10 is operated.

On the other hand, during the CD mode, only in a period from time t(3) to time t(4), the required output exceeds the start-up threshold Pr(1) of the engine 10, and the engine 10 is operated.

Thus, when the control mode is the CD mode, the number of opportunities for the engine 10 to operate (operating period) is smaller than that when the control mode is the CS mode. In other words, the number of opportunities for the engine 10 to operate (operating period) when the control mode is the CS mode is larger than that when the control mode is the CD mode.

In the vehicle 1 having the above-described configuration, because the CD mode has a smaller number of opportunities for the engine 10 to operate than the CS mode, the CD mode is a control mode in which the vehicle 1 tends to travel in a state where the engine 10 is stopped. Therefore, in the vehicle 1 on which the filter 84 for trapping PM is mounted, even when the engine 10 operates during the CD mode, there is a case where the engine 10 stops before regeneration of the filter 84 completes and regeneration of the filter 84 does not complete.

Therefore, the present embodiment has such a characteristic that, when the filter 84 is regenerated, the ECU 200 controls the vehicle 1 in the CS mode having a larger number of opportunities for the engine 10 to operate than the CD mode.

That is, in the present embodiment, the ECU 200 changes the control mode from the CD mode to the CS mode when the control mode is the CD mode and when regeneration of the filter 84 is required. Thus, the number of opportunities for the engine 10 to operate is increased, and regeneration of the filter 84 is completed.

When regeneration of the filter 84 is required and when the control mode has been changed into the CS mode, the ECU 200 keeps the CS mode until regeneration of the filter 84 completes.

In addition, when regeneration of the filter 84 is required and when the control mode has been changed into the CS mode, the ECU 200 may change the control mode of the vehicle 1 from the CS mode to the CD mode after regeneration of the filter 84 has completed.

For example, in the case where regeneration of the filter 84 has completed, the ECU 200 changes the control mode from the CS mode to the CD mode when the SOC of the battery 70 is higher than or equal to a threshold SOC(0), and keeps the CS mode when the SOC of the battery 70 is lower than the threshold SOC(0).

Figure 3:
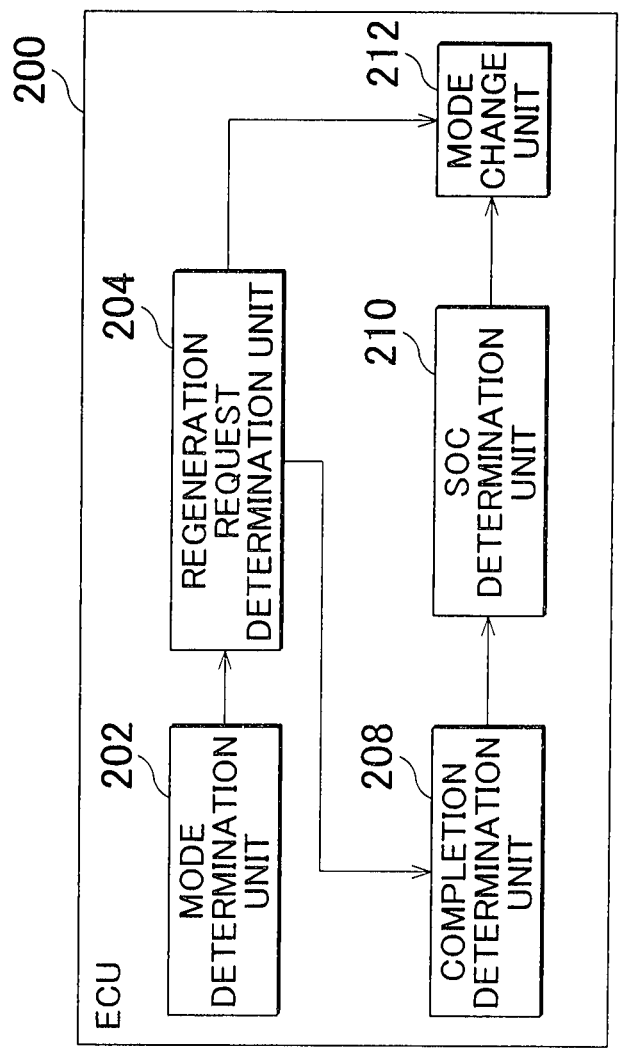
FIG. 3 is a functional block diagram of an ECU according to a first embodiment.

FIG. 3 shows the functional block diagram of the ECU 200 mounted on the vehicle 1 according to the present embodiment. The ECU 200 includes a mode determination unit 202, a regeneration request determination unit 204, a completion determination unit 208, an SOC determination unit 210, and a mode change unit 212.

The mode determination unit 202 determines whether the currently selected control mode is the CD mode.

The regeneration request determination unit 204 determines whether regeneration of the filter 84 is required. When PM has accumulated in the filter 84 to such an extent that overtemperature (OT) is not caused through burning of the PM, the regeneration request determination unit 204 determines that regeneration of the filter 84 is required. In the present embodiment, the regeneration request determination unit 204 determines, by using the upstream-side pressure sensor 90 and the downstream-side pressure sensor 92, whether regeneration of the filter 84 is required.

Specifically, when the difference between the upstream-side pressure detected by the upstream-side pressure sensor 90 and the downstream-side pressure detected by the downstream-side pressure sensor 92 is larger than a threshold, the regeneration request determination unit 204 determines that regeneration of the filter 84 is required. The threshold is used to estimate that the amount of PM accumulated in the filter 84 is larger than or equal to a predetermined amount. The threshold may be a predetermined value adapted through an experiment or a design or may be a value that changes with the operating state of the engine 10.

A method of determining whether regeneration of the filter 84 is required is not limited to the above-described method that uses the upstream-side pressure sensor 90 and the downstream-side pressure sensor 92. For example, the method may be the following method. The ECU 200 estimates the temperature of the filter 84 by utilizing various sensors, such as the air-fuel ratio sensor 86, the oxygen sensor 88, an air flow meter, a throttle opening degree sensor and a coolant temperature sensor. Alternatively, the ECU 200 estimates the amount of PM accumulated in the filter 84 from an operation history, operating time, a decrease in output, or the like, of the engine 10, and, when the estimated amount of PM accumulated is larger than a predetermined amount, determines that regeneration of the filter 84 is required.

The completion determination unit 208 determines whether regeneration of the filter 84 has completed. The completion determination unit 208 determines, by using the upstream-side pressure sensor 90 and the downstream-side pressure sensor 92, whether regeneration of the filter 84 has completed.

Specifically, when the difference between the upstream-side pressure that is detected by the upstream-side pressure sensor 90 and the downstream-side pressure that is detected by the downstream-side pressure sensor 92 is smaller than a threshold, the completion determination unit 208 determines that regeneration of the filter 84 has completed.

The threshold that is used to determine whether regeneration of the filter 84 has completed may be a predetermined value that is adapted by an experiment or a design or may be a value that changes in accordance with the operating state of the engine 10.

The threshold that is used to determine whether regeneration of the filter 84 has completed may be the same value as the threshold that is used to determine whether regeneration of the filter 84 is required or may be smaller than the threshold that is used to determine whether regeneration of the filter 84 is required.

When the completion determination unit 208 determines that regeneration of the filter 84 has completed, the SOC determination unit 210 determines whether the SOC of the battery 70 is higher than or equal to the threshold SOC(0). The threshold SOC(0) is a threshold of the SOC for changing between the CD mode and the CS mode.

When the mode determination unit 202 determines that the control mode is the CD mode and when the regeneration request determination unit 204 determines that regeneration of the filter 84 is required, the mode change unit 212 changes the control mode from the CD mode to the CS mode.

When the mode determination unit 202 determines that the control mode is not the CD mode (the control mode is the CS mode) and when the regeneration request determination unit 204 determines that regeneration of the filter 84 is required, the mode change unit 212 keeps the CS mode.

When the completion determination unit 208 determines that regeneration of the filter 84 has completed and when the SOC determination unit 210 determines that the SOC of the battery 70 is higher than or equal to the threshold SOC(0), the mode change unit 212 changes the control mode from the CS mode to the CD mode.

When the completion determination unit 208 determines that regeneration of the filter 84 has completed and when the SOC determination unit 210 determines that the SOC of the battery 70 is lower than the threshold SOC(0), the mode change unit 212 keeps the CS mode.

A control process that is executed by the ECU 200 mounted on the vehicle 1 according to the present embodiment will be described with reference to FIG. 4.

In step (hereinafter, step is abbreviated as "S") 102, the ECU 200 determines whether the control mode is the CD mode. For example, on the basis of a state (on state or off state) of a flag (mode determination flag) that changes each time the control mode changes, the ECU 200 determines whether the currently selected control mode is the CD mode.

For example, it is assumed that the mode determination flag enters the on state when the CD mode is selected, and enters the off state when the CS mode is selected. For example, when the mode determination flag is in the on state, the ECU 200 may determine that the CD mode is selected; whereas, when the mode determination flag is in the off state, the ECU 200 may determine that the CD mode is not selected (that is, the CS mode is selected).

When it is determined that the control mode is the CD mode (YES in S102), the process proceeds to S104. Otherwise (NO in S102), the process proceeds to S114.

In S104, the ECU 200 determines whether regeneration of the filter 84 is required. For example, when the control mode is the CD mode and when the difference between the upstream-side pressure and downstream-side pressure of the filter 84 is larger than the threshold (that is, the amount of PM accumulated in the filter 84 is larger than or equal to the predetermined amount), the ECU 200 determines that regeneration of the filter 84 is required. When the ECU 200 determines that regeneration of the filter 84 is required, the ECU 200 sets a regeneration request flag to an on state.

When it is determined that regeneration of the filter 84 is required (YES in S104), the process proceeds to S106. Otherwise (NO in S104), the process ends.

In S106, the ECU 200 changes the control mode from the CD mode to the CS mode. For example, when both the regeneration request flag and the mode determination flag are in the on state, the ECU 200 may change the control mode from the CD mode to the CS mode.

In S108, the ECU 200 determines whether regeneration of the filter 84 has completed. Determination as to whether regeneration of the filter 84 has completed is as described above, so the detailed description thereof will not be repeated.

For example, when the regeneration request flag is in the on state, the ECU 200 determines whether regeneration of the filter 84 has completed. When the ECU 200 determines that regeneration of the filter 84 has completed, the ECU 200 sets the regeneration request flag to the off state.

When it is determined that regeneration of the filter 84 has completed (YES in S108), the process proceeds to S110. Otherwise, (NO in S108), the process is returned to S106.

In S110, the ECU 200 determines whether the SOC of the battery 70 is higher than or equal to the threshold SOC(0). For example, when the regeneration request flag has been changed from the on state to the off state, the ECU 200 may determine whether the SOC of the battery 70 is higher than or equal to the threshold SOC(0), and, when the SOC of the battery 70 is higher than or equal to the threshold SOC(0), the ECU 200 may set the SOC determination flag to the on state.

When it is determined that the SOC of the battery 70 is higher than or equal to the threshold SOC(0) (YES in S110), the process proceeds to S112. Otherwise (NO in S110), the process proceeds to S114.

In S112, the ECU 200 changes the control mode from the CS mode to the CD mode. For example, when the regeneration request flag is changed from the on state to the off state and the SOC determination flag is in the on state, the ECU 200 may change the control mode from the CS mode to the CD mode.

In S114, the ECU 200 keeps the CS mode. For example, when the mode determination flag is in the off state, the ECU 200 may keep the CS mode. Alternatively, for example, when the regeneration request flag is changed from the on state to the off state and when the SOC determination flag is in the off state, the ECU 200 may keep the CS mode.

The operation of the ECU 200 mounted on the vehicle 1 according to the present embodiment based on the above-described structure and flowchart will be described with reference to FIG. 5 and FIG. 6.

Hereinafter, the regeneration operation of the filter 84 in the case where the control mode is changed into the CS mode at the time when regeneration of the filter 84 is required during the CD mode will be described with reference to FIG. 5.

Figure 5:
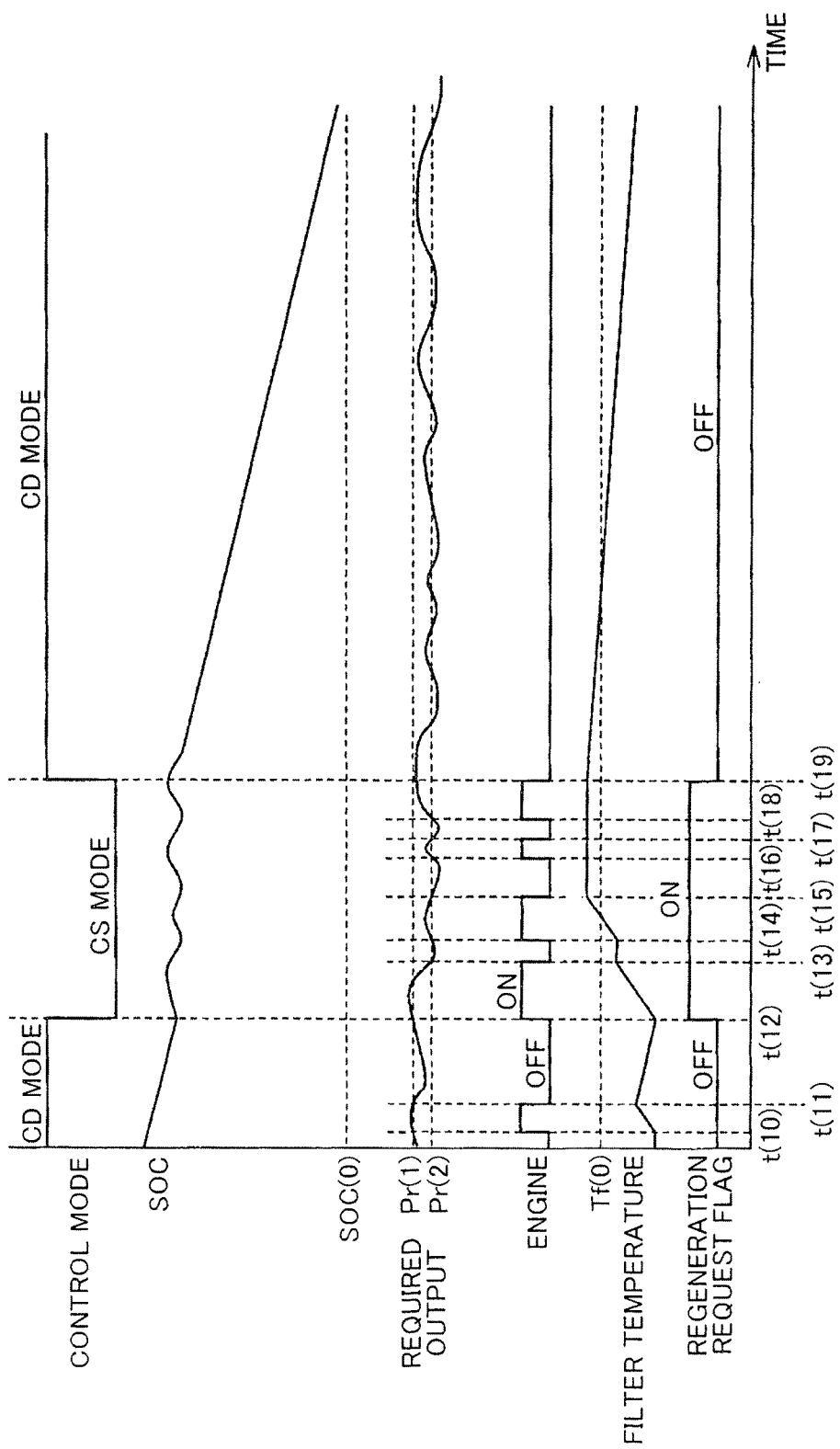
FIG. 5 is a timing chart for illustrating filter regeneration operation when the control mode is changed into a CS mode in the case where regeneration of the filter is required during a CD mode.

For example, it is assumed that the control mode is the CD mode (YES in S102) As shown in FIG. 5, when the required output exceeds the start-up threshold Pr(1) of the engine 10 at time t(10), the engine 10 starts up. After start-up of the engine 10, when the differential pressure between the upstream-side pressure and the downstream-side pressure does not exceed the threshold (that is, when the amount of PM accumulated in the filter 84 is smaller than the predetermined amount), it is not determined that regeneration of the filter 84 is required (NO in S104), so the regeneration request flag remains in the off state. When the engine 10 is operated, the temperature of the filter 84 increases by the heat of exhaust gas of the engine 10. When the required output becomes lower than the start-up threshold Pr(1) of the engine 10 at time t(11), the engine 10 is stopped. When the engine 10 is stopped, an increase in the temperature of the filter 84 is suppressed. Therefore, the temperature of the filter 84 decreases with a lapse of time from time t(11).

When the required output exceeds the start-up threshold Pr(l) of the engine 10 at time t(12), the engine 10 starts up again. After start-up of the engine 10, when the differential pressure between the upstream-side pressure and downstream-side pressure of the filter 84 exceeds a threshold (that is, the amount of PM accumulated in the filter 84 becomes larger than the predetermined amount), it is determined that regeneration of the filter 84 is required (YES in S104), so the regeneration request flag enters the on state.

As a result of the fact that the regeneration request flag enters the on state, the control mode is changed from the CD mode to the CS mode (S106). When the control mode is changed from the CD mode to the CS mode, the start-up threshold of the engine 10 is changed from Pr(1) to Pr(2). Therefore, in a period from time t(12) to time t(19), the engine 10 is more easy to start up than when the CS mode is selected as described with reference to FIG. 2.

Thus, in a period from time t(12) to time t(13), a period from time t(14) to time t(15), a period from time t(16) to time t(17) and a period from time t(18) to time t(19), when the required output exceeds the start-up threshold Pr(2) of the engine 10, the engine 10 is operated.

On the other hand, in a period from time t(13) to time t(14), a period from time t(15) to time t(16) and a period from time t(17) to time t(18), when the required output does not exceed the start-up threshold Pr(2) of the engine 10 (when the required output becomes lower than the stop threshold during the CS mode), the engine 10 is stopped.

Therefore, in a period from time t(12) to time t(19), the SOC is controlled so that the SOC at the timing of time t(12) at which the control mode has been changed into the CS mode is kept. As a result, the SOC of the battery 70 fluctuates with reference to the SOC at the timing of time t(12) at which the control mode has been changed into the CS mode.

When the engine 10 is operated, the temperature of the filter 84 increases by the heat of exhaust gas of the engine 10. On the other hand, when the engine 10 is stopped, an increase in the temperature of the filter 84 is suppressed.

Therefore, after the timing at which the control mode has been changed from the CD mode to the CS mode at time t(12), the temperature of the filter 84 increases in a stepwise manner with a lapse of time, and exceeds a regeneratable temperature Tf(0) after time t(14). When the temperature of the filter 84 exceeds the regeneratable temperature Tf(0), the filter 84 can be regenerated. At this time, in the filter 84, for example, PM is burned and removed by an oxygen component that is contained in gas flowing through the exhaust passage, and regeneration of the filter advances.

When it is determined at time t(19) that regeneration of the filter 84 has completed (YES in S108), because the SOC of the battery 70 is higher than or equal to the threshold SOC(0) (YES in S110), the regeneration request flag is changed to the off state, and the control mode is changed from the CS mode to the CD mode (S112).

When the control mode is changed from the CS mode to the CD mode, the start-up threshold of the engine 10 is changed from Pr(2) to Pr(1). As a result, the required output does not exceed Pr(2) after time t(19), so the engine 10 is kept stopped.

When the control mode is changed into the CD mode from time t(19), the number of opportunities for the engine 10 to operate is smaller than that during the CS mode. Therefore, the SOC of the battery 70 decreases (is not kept) from time t(19).

When it is determined that regeneration of the filter 84 has completed (YES in S108), and when the SOC of the battery 70 is lower than the threshold SOC(0) (NO in S110), the CS mode is kept as the control mode (S114).

Hereinafter, a comparative embodiment of the regeneration operation of the filter 84 in the case where the control mode is not changed into the CS mode at the time when regeneration of the filter is required during the CD mode will be described with reference to FIG. 6.

For example, it is assumed that the control mode is the CD mode. The regeneration operation from time t(10) to time t(12) in FIG. 6 is similar to that from time t(10) to time t(12) in FIG. 5. Therefore, the detailed description will not be repeated. As described above, the regeneration request flag enters the on state at time t(12).

When the required output becomes lower than the start-up threshold Pr(1) of the engine 10 at time t(13), the engine 10 is stopped. In a period from time t(13) to time t(22), when the required output does not exceed the start-up threshold Pr(1) of the engine 10, the engine 10 is kept stopped. In a period from time t(13) to time t(22), when the engine 10 is kept stopped, the temperature of the filter 84 decreases with a lapse of time.

When the SOC of the battery 70 becomes lower than the threshold SOC(0) at time t(22), the control mode is changed from the CD mode to the CS mode. When the control mode is changed from the CD mode to the CS mode, the start-up threshold of the engine 10 is changed from Pr(1) to Pr(2). Therefore, as described with reference to FIG. 2, the engine 10 becomes easy to start up.

As a result, in a period from time t(22) to time t(23), a period from time t(24) to time t(25), a period from time t(26) to time t(27) and a period from time t(28) to time t(29), when the required output exceeds the start-up threshold Pr(2) of the engine 10, the engine 10 is operated.

On the other hand, in a period from time t(23) to time t(24), a period from time t(25) to time t(26) and a period from time t(27) to time t(28), when the required output does not exceed the start-up threshold Pr(2) of the engine 10, the engine 10 is stopped.

Therefore, from time t(22), the SOC is controlled so that the SOC at the timing of time t(22) at which the control mode has been changed into the CS mode is kept. As a result, the SOC of the battery 70 fluctuates with reference to the SOC at the timing of time t(22) at which the control mode has been changed into the CS mode.

When the engine 10 is operated, the temperature of the filter 84 increases by the heat of exhaust gas from the engine 10. On the other hand, when the engine 10 is stopped, an increase in the temperature of the filter 84 is suppressed.

Therefore, after the timing at which the control mode has been changed from the CD mode to the CS mode at time t(22), the temperature of the filter 84 increases in a stepwise manner with a lapse of time, and exceeds the regeneratable temperature Tf(0) after time t(26). When the temperature of the filter 84 exceeds the regeneratable temperature Tf(0), the filter 84 can be regenerated. At this time, in the filter 84, for example, PM is burned and removed by an oxygen component that is contained in gas flowing through the exhaust passage, and regeneration of the filter advances.

Figure 6:
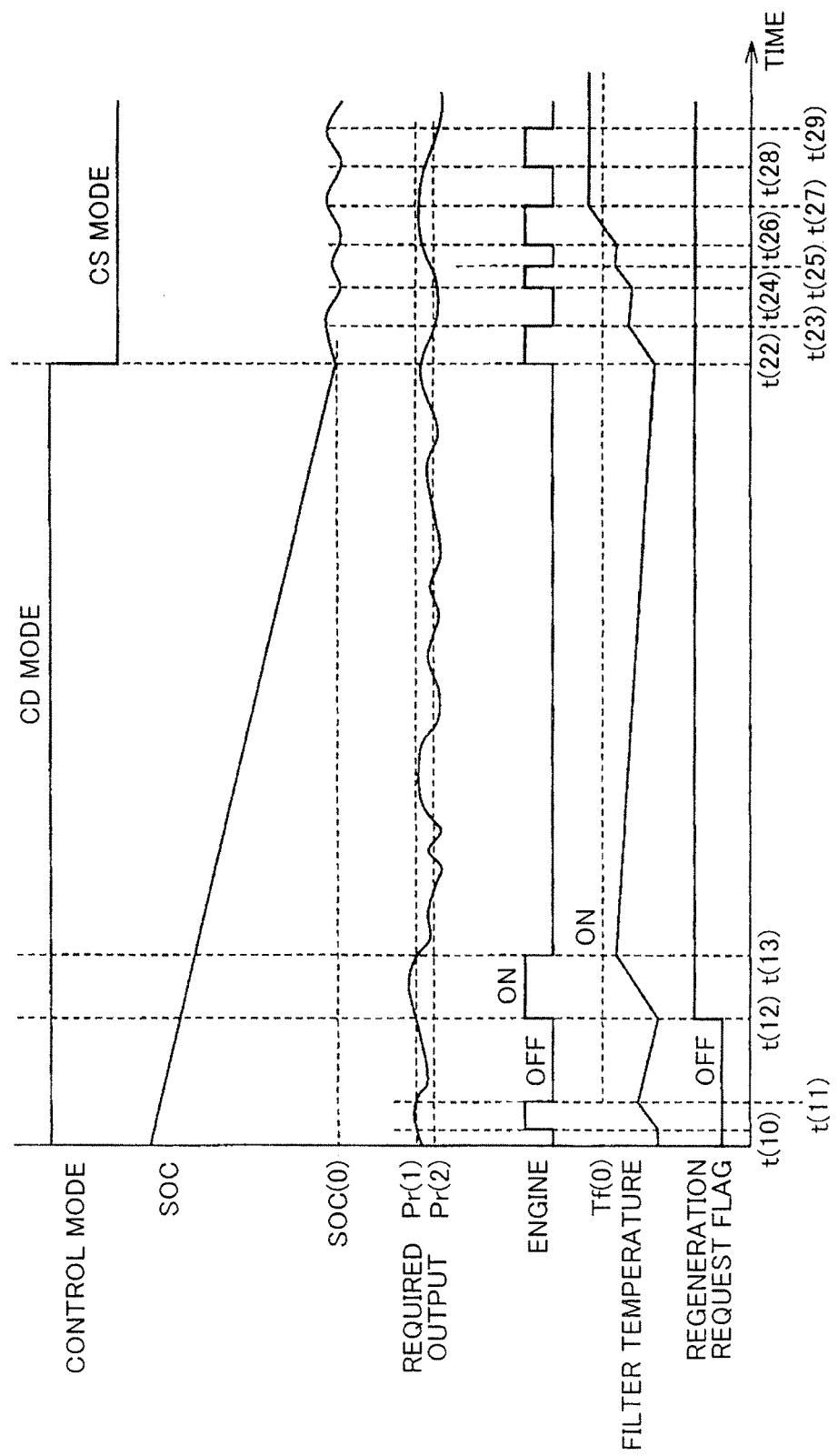
FIG. 6 is a timing chart for illustrating filter regeneration operation when the control mode is not changed into the CS mode in the case where regeneration of the filter is required during the CD mode.

In this way, with the hybrid vehicle according to the present embodiment, as shown in FIG. 5, when the control mode is the CD mode and when regeneration of the filter 84 is required, the control mode of the vehicle 1 is changed from the CD mode to the CS mode, so it is possible to extend the operating time of the engine 10 by increasing the number of opportunities for the engine 10 to operate as compared to the case where the control mode is not changed into the CS mode as shown in FIG. 6 (that is, the case where the CD mode is kept). Therefore, it is possible to reliably regenerate the filter 84 by early increasing the temperature of the filter 84 to the regeneratable temperature Tf(0) as compared to the case shown in FIG. 6. Thus, it is possible to provide the hybrid vehicle and the control method for a hybrid vehicle, which reliably complete regeneration of the filter in the case where the control mode having a smaller number of opportunities for the engine to operate is selected.

When the control mode is changed from the CD mode to the CS mode as a result of the fact that it is determined that regeneration of the filter 84 is required, because the CS mode is kept until regeneration of the filter 84 completes, it is possible to keep a state where there is a large number of opportunities for the engine 10 to operate. Therefore, it is possible to reliably complete regeneration of the filter 84 by increasing the temperature of the filter to the regeneratable temperature.

When the control mode is changed from the CD mode to the CS mode as a result of the fact that it is determined that regeneration of the filter 84 is required, and when the SOC of the battery 70 is higher than or equal to the threshold SOC(0) after regeneration of the filter 84 has completed, by changing the control mode from the CS mode to the CD mode, it is possible to quickly eliminate a state where there is a large number of opportunities for the engine 10 to operate although the user recognizes that the CD mode is selected. When the SOC of the battery 70 is lower than the threshold SOC(0) after regeneration of the filter 84 has completed, it is possible to suppress a decrease in the SOC by keeping the CS mode. Therefore, when regeneration of the filter 84 has completed, it is possible to appropriately select the control mode in accordance with the SOC of the battery 70. In the present embodiment, description is made on the assumption that, when the control mode is the CD mode and when regeneration of the filter 84 is required, the control mode is changed from the CD mode to the CS mode. Instead, as alternative embodiment to first embodiment, for example, when the control mode is the CD mode and when regeneration of the filter 84 is required, the engine 10 may be started up if the engine 10 is stopped and then the control mode may be changed from the CD mode to the CS mode.

In this case, for example, in a state where the engine 10 is stopped, the ECU 200 determines whether regeneration of the filter 84 is required. Specifically, when the travel history of the vehicle 1 coincides with a predetermined travel history (for example, when a total travel distance or total travel time of the vehicle 1 is longer than or equal to a threshold), the ECU 200 determines that regeneration of the filter 84 is required.

Figure 7:
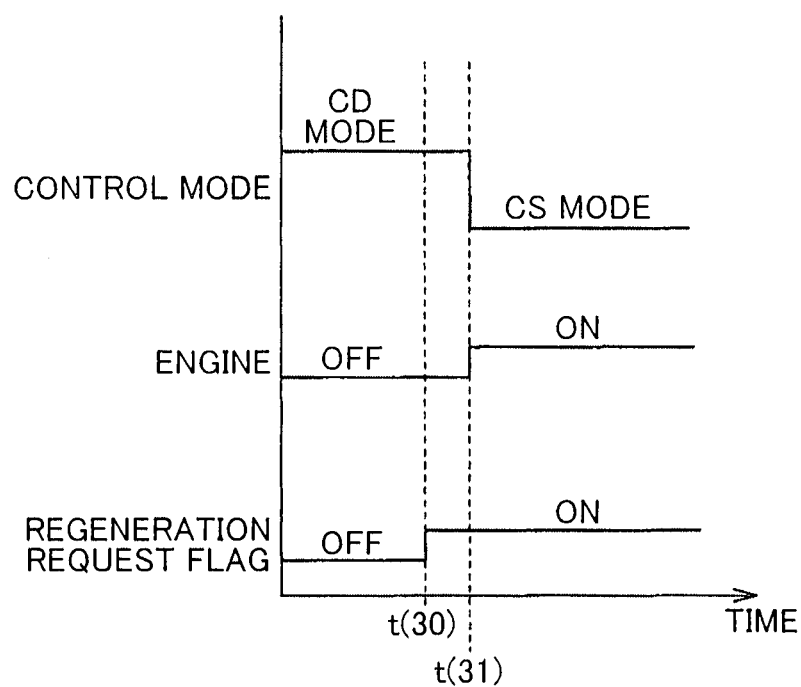
FIG. 7 is a first timing chart for illustrating the operation of the ECU according to an alternative embodiment.

The ECU 200, for example, assumes that the control mode is the CD mode, the engine is stopped and the regeneration request flag is in the off state, as shown in FIG. 7. When the travel history of the vehicle 1 coincides with the predetermined travel history at time t(30), the ECU 200 sets the regeneration request flag to the on state. Thereafter, at time t(31), the ECU 200 starts up the engine 10 and changes the control mode from the CD mode to the CS mode. In this way as well, it is possible to early complete regeneration of the filter. The ECU 200 may start up the engine 10 and change the control mode from the CD mode to the CS mode a predetermined time after the regeneration request flag is set to the on state, or may start up the engine 10 when the required output exceeds the start-up threshold Pr(1), or may start up the engine 10 just after the regeneration request flag is set to the on state.

In the present embodiment, description is made on the assumption that the engine 10 is started up when the required vehicle power exceeds the start-up threshold and the engine 10 is stopped when the required vehicle power becomes lower than the stop threshold. Instead, for example, the engine 10 may be started up when the vehicle speed V instead of the required vehicle power exceeds a start-up threshold, and may be stopped when the vehicle speed V becomes lower than a stop threshold.

In this case, for example, during the CD mode, the engine 10 may be started up when the vehicle speed V exceeds a first start-up threshold Vr(1), and may be stopped when the vehicle speed V becomes lower than a first stop threshold Vs(1); whereas, during the CS mode, the engine 10 may be started up when the vehicle speed V exceeds a second start-up threshold Vr(2), and may be stopped when the vehicle speed V becomes lower than a second stop threshold Vs(2). In this case, the first start-up threshold Vr(1) is higher than the second start-up threshold Vr(2), and the first stop threshold Vs(1) is higher than the second stop threshold Vs(2). The first stop threshold Vs(1) is a predetermined value lower than or equal to the first start-up threshold Vr(1), and the second stop threshold Vs(2) is a predetermined value lower than or equal to the second start-up threshold Vr(2).

Figure 8:
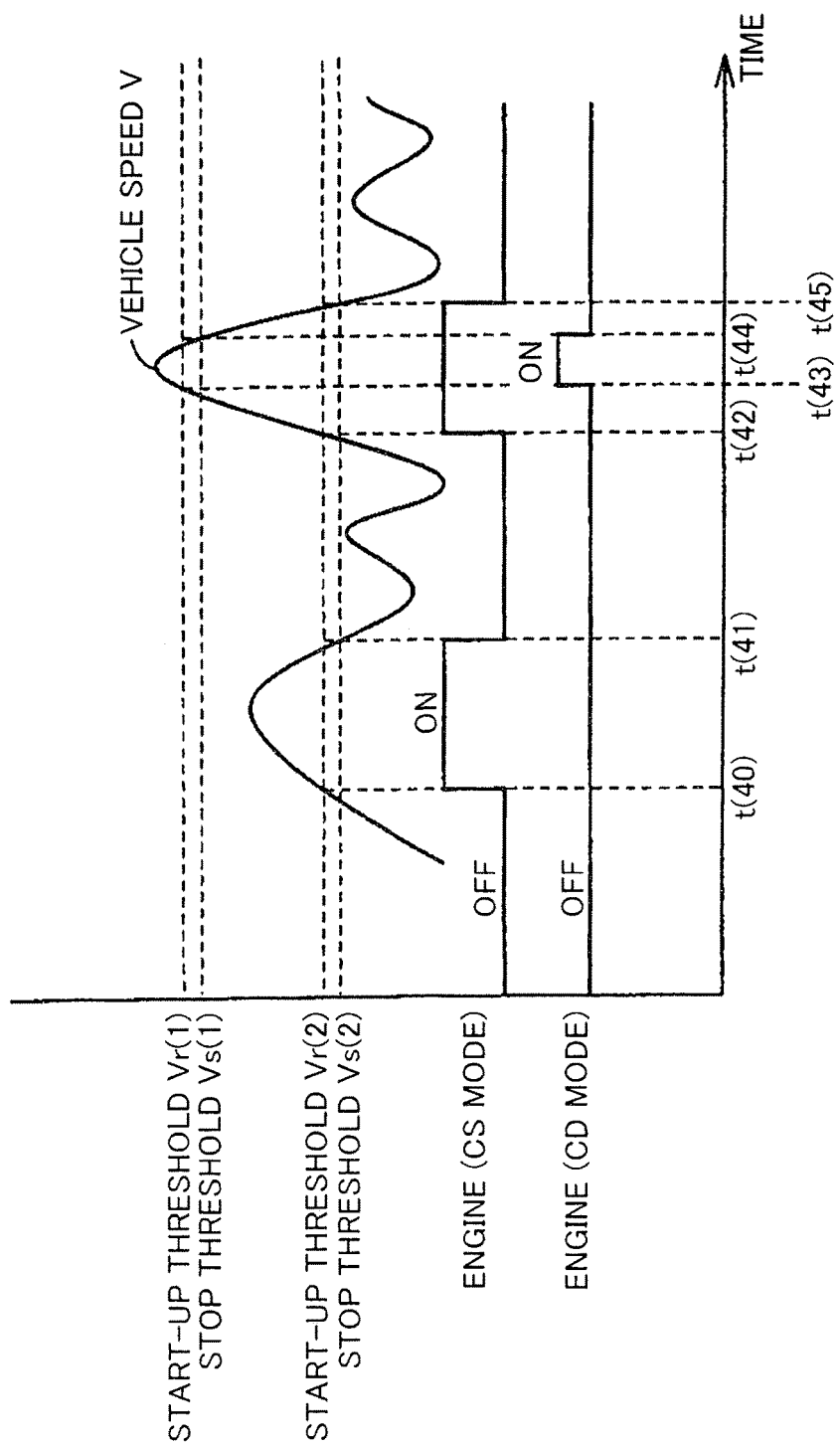
FIG. 8 is a second timing chart for illustrating the operation of the ECU according to an alternative embodiment.

With this configuration, as shown in FIG. 8, when the control mode is the CS mode, the vehicle speed V exceeds the start-up threshold Vr(2) at time t(40) and at time t(42), so the engine 10 is started up. When the control mode is the CS mode, the vehicle speed V becomes lower than the stop threshold Vs(2) at time t(41) and at time t(45), so the engine 10 is stopped.

On the other hand, when the control mode is the CD mode, the vehicle speed V exceeds the start-up threshold Vr(1) only at time t(43), so the engine 10 is started up. When the control mode is the CD mode, the vehicle speed V becomes lower than the stop threshold Vs(1) at time t(43), so the engine 10 is stopped.

In this way, when the control mode is the CS mode, the engine 10 starts up at a lower speed than that when the control mode is the CD mode, so it is possible to increase the number of opportunities for the engine 10 to operate. The first start-up threshold and second start-up threshold of the engine 10 are desirably set from the viewpoint of, for example, preventing excessive rotation of the first MG 20 due to a high vehicle speed V.

In the present embodiment, description is made on the assumption that, when the control mode is the CD mode and when regeneration of the filter 84 is required, the control mode is changed into the CS mode. Instead, for example, when the vehicle 1 is traveling in the CD mode and when the engine 10 starts up, the ECU 200 may set the regeneration request flag to the on state, and may change the control mode from the CD mode to the CS mode.

Figure 9:
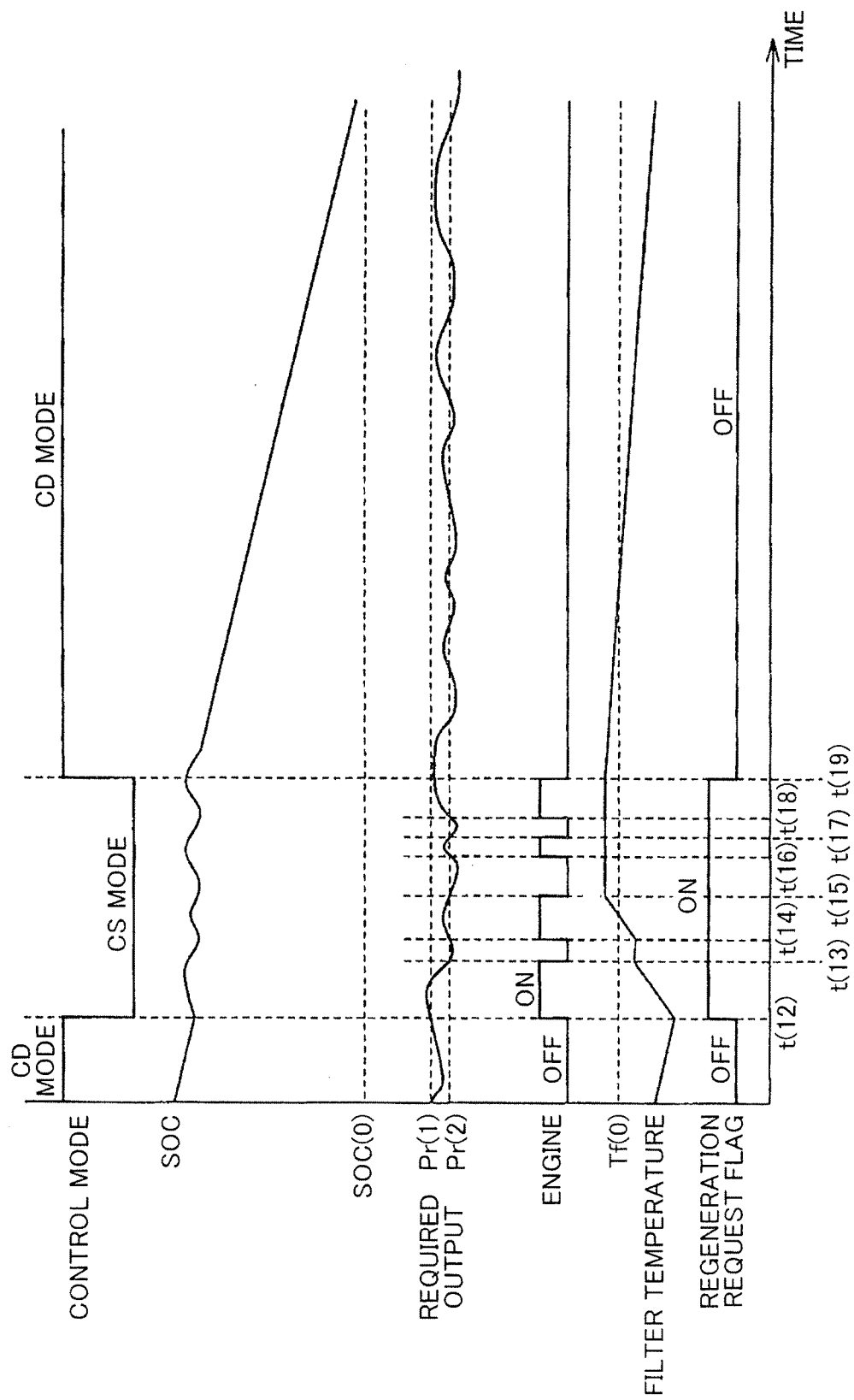
FIG. 9 is a third timing chart for illustrating the operation of the ECU according to an alternative embodiment.

For example, as shown in FIG. 9, it is assumed that the control mode is the CD mode. When the required output exceeds the start-up threshold Pr(1) of the engine 10 at time t(12), the ECU 200 starts up the engine 10. The ECU 200 starts up the engine 10 and sets the regeneration request flag to the on state irrespective of the differential pressure between the upstream-side pressure and the downstream-side pressure (that is, irrespective of the amount of PM accumulated in the filter 84). The ECU 200 sets the regeneration request flag to the on state, and changes the control mode from the CD mode to the CS mode. When the control mode is changed from the CD mode to the CS mode, the start-up threshold of the engine 10 is changed from Pr(1) to Pr(2). The operation after time t(12) is similar to the operation after time t(12) in FIG. 6, so the detailed description thereof will not be repeated.

In the present embodiment, description is made on the assumption that the ECU 200 changes from any one of the two control modes, that is, the CD mode and the CS mode, to the other one. Instead, for example, the ECU 200 may change the control mode from any one of a plurality of control modes, including the CD mode, the CS mode and a control mode other than the CD mode or the CS mode, to another one.

In the present embodiment, description is made on the assumption that the CD mode and the CS mode are control modes having different start-up thresholds of the engine 10. Instead, the CD mode and the CS mode may be set from the viewpoint of having relatively different numbers of opportunities for the engine 10 to operate between the two control modes. Hereinafter, a vehicle according to a second embodiment will be described. The vehicle 1 according to the present embodiment differs from the configuration of the vehicle 1 shown in FIG. 1 according to the above-described first embodiment in the operation of a controller 100. The other components are the same as the components of the vehicle 1 shown in FIG. 1 according to the first embodiment. Like reference numerals denote the same components. The functions of the corresponding components are also the same. Therefore, the detailed description thereof will not be repeated.

In the above-described embodiment, description is made on the assumption that, when the control mode is the CD mode and when regeneration of the filter 84 is required, regeneration of the filter 84 is facilitated by increasing the temperature of the filter 84 to the regeneratable temperature Tf(0) or higher as a result of increasing the number of opportunities for the engine 10 to operate by changing the control mode from the CD mode to the CS mode. However, when an increase in the temperature of the filter 84 is suppressed depending on a traveling situation, a time may be required to regenerate the filter 84.

Therefore, the present embodiment has such a characteristic that, when the control mode is the CD mode and when the filter 84 is regenerated, the ECU 200 changes the control mode from the CD mode to the CS mode and executes regeneration control over the filter 84.

Regeneration control over the filter 84 increases the temperature of the filter 84 to a regeneratable temperature (activation temperature) Tf(0) or higher (hereinafter, also referred to as temperature increasing control), and burns and removes PM accumulated in the filter 84 by supplying air including oxygen to the filter 84. PM accumulated in the filter 84 oxidizes by burning reaction with $O_2$ through regeneration control, and is removed from the filter 84. Supply of air to the filter 84 may be, for example, carried out in a state where supply of fuel to the engine 10 is stopped and by setting the opening degree of a throttle valve (not shown) to a predetermined opening degree (for example, fully opening the throttle valve) and rotating the output shaft of the engine 10 by using the output torque of the first MG 20.

Figure 10:
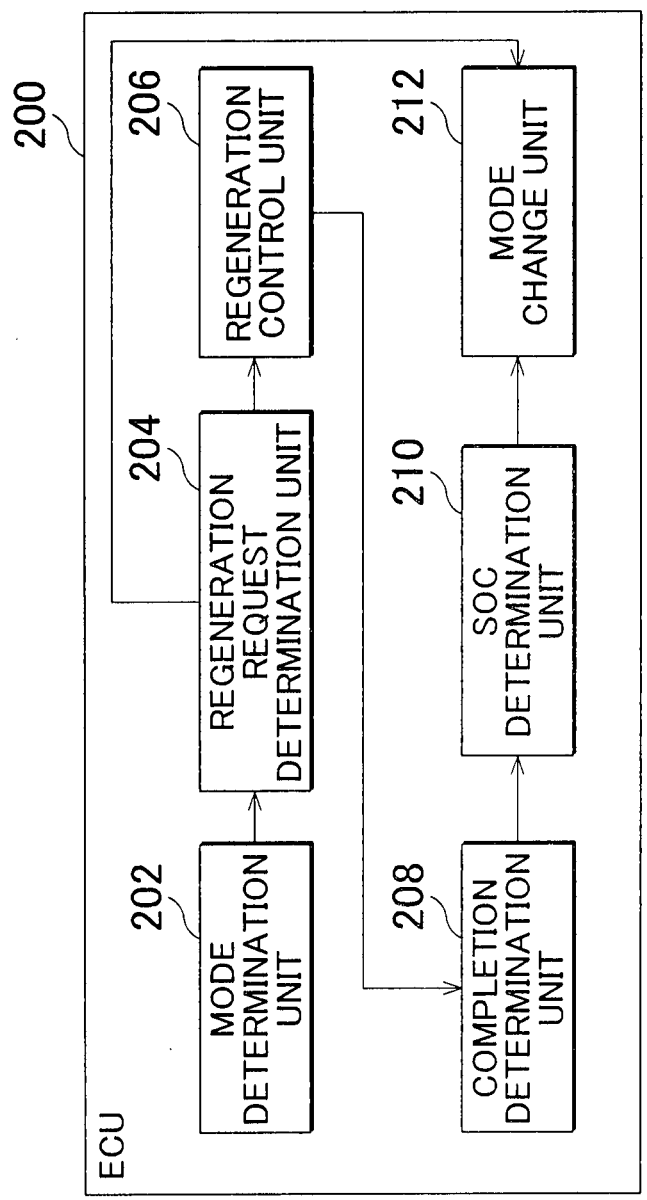
FIG. 10 is a functional block diagram of an ECU according to a second embodiment.

FIG. 10 shows the functional block diagram of the ECU 200 mounted on the vehicle 1 according to the present embodiment. The functional block diagram of the ECU 200 shown in FIG. 10 differs from the functional block diagram of the ECU 200 shown in FIG. 3 in that a regeneration control unit 206 is included.

In the present embodiment, when the control mode is the CD mode and when regeneration of the filter 84 is required, the regeneration control unit 206 executes regeneration control when the engine 10 is operated. That is, when the regeneration request determination unit 204 determines that regeneration of the filter 84 is required, the regeneration control unit 206 executes regeneration control over the filter 84.

Temperature increasing control over the filter 84 at the time when regeneration control is executed in the present embodiment, for example, includes output raising control and ignition retardation control. The regeneration control unit 206 executes at least one of output raising control or ignition retardation control as temperature increasing control at the time when regeneration control is executed.

Output raising control raises the output of the engine 10 so that exhaust gas temperature increases. Specifically, output raising control increases the temperature of the filter 84 to the regeneratable temperature Tf(0) by raising the output of the engine 10 over an ordinary value so that the exhaust gas temperature of the engine 10 increases. The output of the engine 10 is raised by adjusting at least one of the throttle opening degree, the fuel injection amount, or the ignition timing.

For example, when the ECU 200 executes regeneration control, the ECU 200 determines the output power of the engine 10 on the basis of a required driving power and then causes the engine 10 to output the output power obtained by increasing the determined output power (ordinary value) by a predetermined raising amount.

Part or all of redundant output resulting from raising the output of the engine 10 is converted to electric power generated by the first MG 20, and is supplied to the battery 70 (the battery 70 is charged).

The output of the engine 10 may be raised by stepwisely changing from the ordinary value to a value increased by the predetermined raising amount when regeneration control is executed. Alternatively, the output of the engine 10 may be raised by linearly or non-linearly increasing from the ordinary value to a value increased by the predetermined raising amount with a lapse of time.

The predetermined raising amount is, for example, set in consideration of the response of an increase in the temperature of the filter 84, or the like. The raising amount is not limited to a predetermined amount. The raising amount may be set on the basis of the degree of PM clogged (the amount of PM accumulated) in the filter 84 and an acceptable electric power based on the SOC, temperature, and the like, of the battery 70.

Because the exhaust gas temperature is increased by raising the output of the engine 10 over the ordinary value as compared to that in the case where the output of the engine 10 is controlled in accordance with the ordinary value, it is possible to early increase the temperature of the filter 84 to the regeneratable temperature Tf(0). Therefore, it is possible to early remove PM accumulated in the filter 84.

Ignition retardation control retards the ignition timing of the engine 10 so that the exhaust gas temperature increases. Specifically, ignition retardation control increases the temperature of the filter 84 to the regeneratable temperature Tf(0) by retarding the ignition timing of the engine 10 with respect to an ordinary value by a predetermined retardation amount so that the exhaust temperature of the engine 10 increases.

For example, when the output power of the engine 10 is determined, the ECU 200 obtains a base ignition timing on the basis of the determined output power. The ECU 200 controls an actual ignition timing by using a result obtained by correcting the obtained base ignition timing with a correction amount associated with an intake air temperature, an EGR amount, and the like. Therefore, the ECU 200 corrects the base ignition timing with a correction amount corresponding to a predetermined amount in addition to the correction amount for the intake air temperature, the EGR amount, and the like, when regeneration control is executed.

The amount of decrease in the output of the engine 10, which occurs as a result of retarding the ignition timing with respect to the ordinary value by the predetermined retardation amount, is, for example, compensated by an increase in the output of the second MG 30, or the like. Therefore, the amount of discharge from the battery 70 increases.

The ignition timing may be retarded by stepwisely changing from the ordinary value to a value retarded by the predetermined retardation amount when regeneration control is executed. Alternatively, the ignition timing may be retarded by linearly or non-linearly changing from the ordinary value to the value retarded by the predetermined retardation amount with a lapse of time when regeneration control is executed.

The predetermined retardation amount is, for example, set in consideration of the response of an increase in the temperature of the filter 84, or the like. The retardation amount is not limited to the predetermined amount. The retardation amount may be set on the basis of the degree of PM clogged (the amount of PM accumulated) in the filter 84, the state of the battery 70, or the like.

Because the exhaust gas temperature is increased by retarding the ignition timing of the engine 10 with respect to the ordinary value as compared to that in the case where the ignition timing is set to the ordinary value, it is possible to early increase the temperature of the filter 84 to the regeneratable temperature Tf(0). Therefore, it is possible to early remove PM accumulated in the filter 84.

As temperature increasing control, in addition to at least one of the above-described engine output raising control or ignition retardation control, heating control for heating the filter 84 with the use of a heat source (for example, a heating device, such as a heater) other than the engine may be executed.

In the present embodiment, during execution of regeneration control as well, the engine 10 intermittently operates or continuously operates on the basis of the state of the vehicle 1 (the state of the battery 70, an accelerator operation amount, the speed of the vehicle, and the like). In this case, the regeneration control unit 206 executes temperature increasing control each time the engine 10 is operated (each time the engine 10 starts up).

For example, when regeneration control is executed together with start-up of the engine 10, the regeneration control unit 206 may execute regeneration control until the temperature of the filter 84 reaches a predetermined temperature (the regeneratable temperature Tf(0) of the filter 84), and may stop regeneration control when the temperature of the filter 84 reaches the predetermined temperature.

For example, when the temperature of the filter 84 significantly exceeds a predetermined temperature (for example, the temperature of the filter 84 is close to an upper limit temperature of the filter 84 or falls within an overheat region of the filter 84) or when it is estimated that the temperature of the filter 84 significantly exceeds the predetermined temperature, the regeneration control unit 206 may stop the operation of the engine 10 or temperature increasing control until the temperature of the filter 84 falls within a predetermined range higher than or equal to the regeneratable temperature Tf(0) and lower than the upper limit temperature or until it is estimated that the temperature of the filter 84 falls within the predetermined range even during execution of regeneration control.

A control process that is executed by the ECU 200 mounted on the vehicle according to the present embodiment will be described with reference to FIG. 11.

Figure 4:
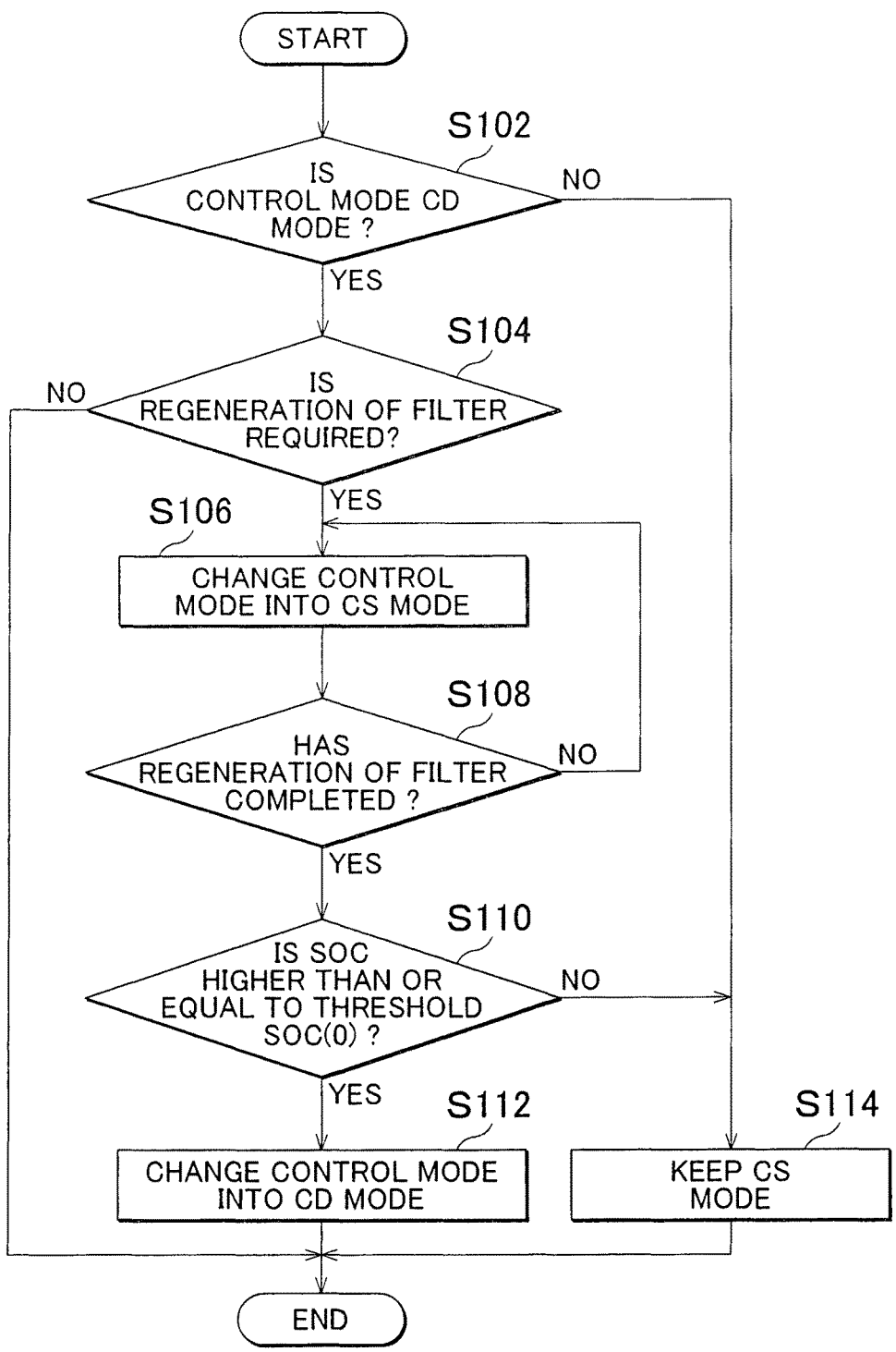
FIG. 4 is a flowchart that shows a control process that is executed by the ECU according to the first embodiment.
Figure 11:
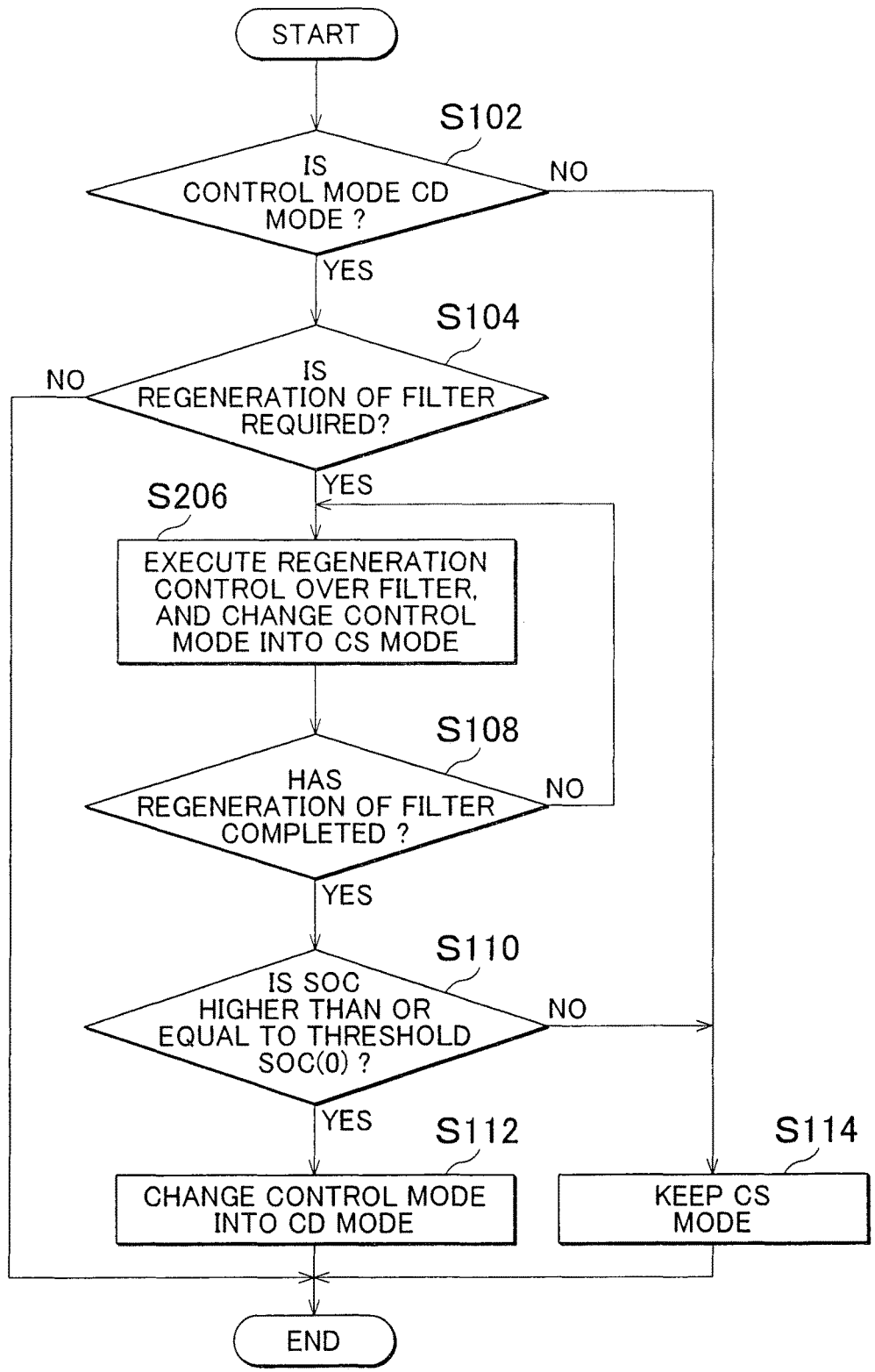
FIG. 11 is a flowchart that shows a control process that is executed by the ECU according to the second embodiment.

The process shown in the flowchart of FIG. 11 differs from the process shown in the flowchart of FIG. 4 in that the process of S206 is executed instead of S106 in FIG. 4, and the process other than that is the same. Therefore, the detailed description thereof will not be repeated.

When it is determined that regeneration of the filter 84 is required (YES in S104), the ECU 200 changes the control mode from the CD mode to the CS mode and executes regeneration control in S206. The control details of regeneration control are as described above, so the detailed description thereof will not be repeated.

For example, when the regeneration request flag is in the on state, the ECU 200 may execute regeneration control. The ECU 200 may, for example, set a regeneration control execution flag to the on state together with execution of regeneration control. For example, when regeneration control is stopped as a result of stop of the engine 10 during execution of regeneration control or when regeneration control is stopped as a result of the fact that it is determined that regeneration of the filter 84 has completed, the ECU 200 may set the regeneration control execution flag to the off state.

The operation of the ECU 200 mounted on the vehicle 1 according to the present embodiment based on the above-described structure and flowchart will be described with reference to FIG. 12.

Figure 12:
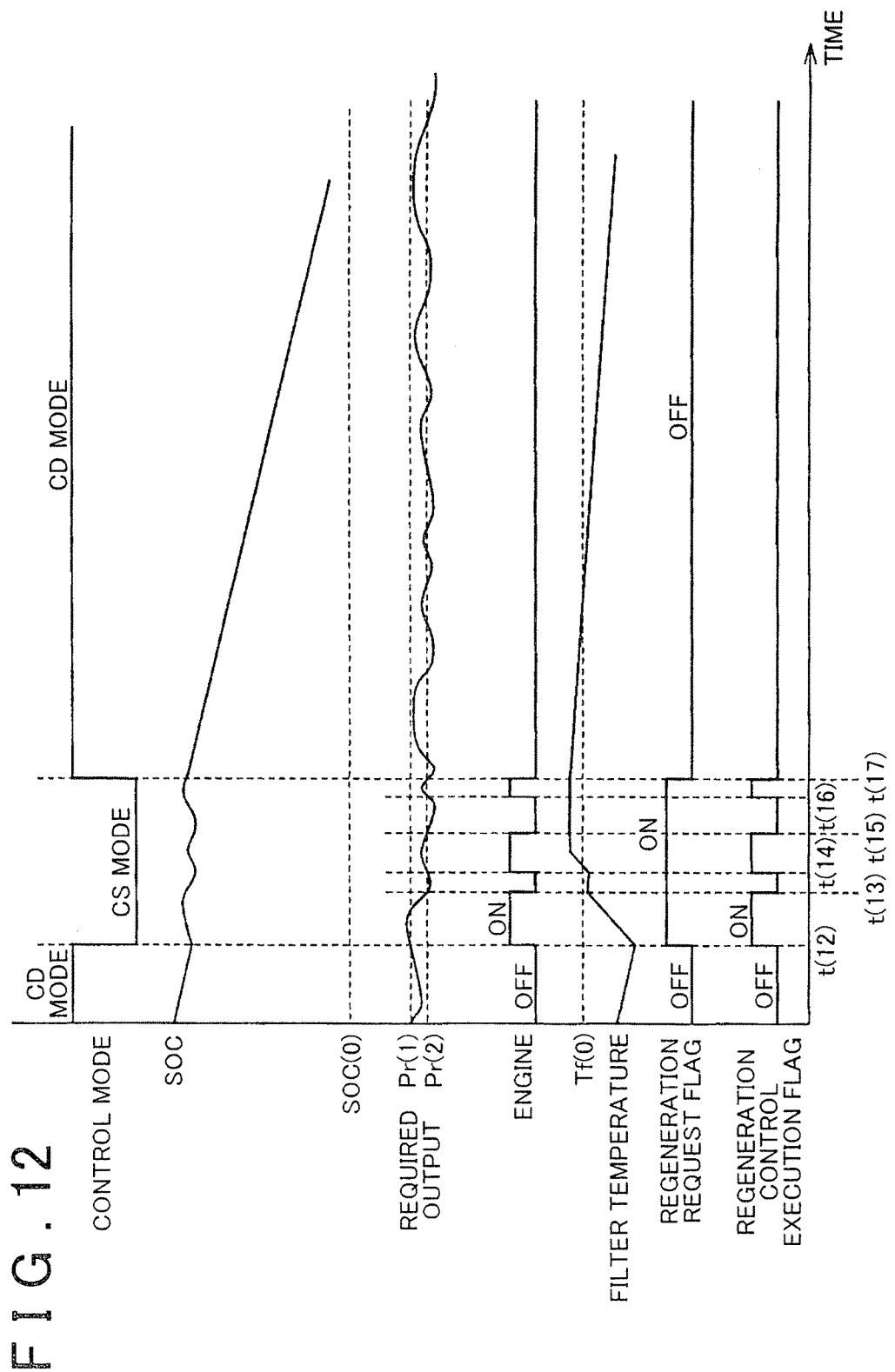
FIG. 12 is a timing chart for illustrating filter regeneration operation according to the second embodiment.

FIG. 12 differs from FIG. 5 in that the operation of the ECU 200 before time t(11) is not shown, the degree of increase in temperature of the filter 84 is large because of regeneration control, the state of the regeneration control execution flag is indicated and the timing at which regeneration of the filter 84 completes (that is, the timing at which the control mode returns to the CD mode), and changes and operations other than the above are as described with reference to FIG. 5. Therefore, in the following description, the operations and changes different from the details described with reference to FIG. 5 will be mainly described.

As shown in FIG. 12, when the required output exceeds the start-up threshold Pr(1) of the engine 10 at time t(12), the engine 10 starts up. When the engine 10 starts up and when it is determined that regeneration of the filter 84 is required (YES in S104), the regeneration request flag enters the on state.

As a result of the fact that the regeneration request flag enters the on state, the control mode is changed from the CD mode to the CS mode, and regeneration control is executed (S206). Therefore, the regeneration control execution flag enters the on state.

In a period from time t(12) to time t(17), each time the engine is operated, regeneration control is executed and the regeneration control execution flag enters the on state; whereas each time the engine 10 is stopped, regeneration control is stopped and the regeneration control execution flag enters the off state.

When regeneration control is executed, it is possible to increase the temperature of the filter 84 to the regeneratable temperature Tf(0) or higher earlier than when regeneration control is not executed by temperature increasing control. At this time, in the filter 84, PM is burned and removed by an oxygen component contained in gas flowing through the exhaust passage 80.

After the control mode has been changed into the CS mode, when the engine 10 is stopped (supply of fuel is stopped), the output shaft of the engine 10 is rotated by using the output torque of the first MG 20. Thus, the operation of supplying air ($O_2$) to the filter 84 may be executed. With this configuration, it is possible to further facilitate regeneration of the filter 84.

When it is determined that regeneration of the filter 84 has completed (YES in S108) at time t(17) that is the timing earlier than time t(19) at which it is determined that regeneration of the filter 84 has completed in the case shown in FIG. 5, because the SOC of the battery 70 is higher than or equal to the threshold SOC(0) (YES in S110), the regeneration request flag and the regeneration control execution flag enter the off state, and the control mode is changed from the CS mode to the CD mode (S112).

Figure 13:
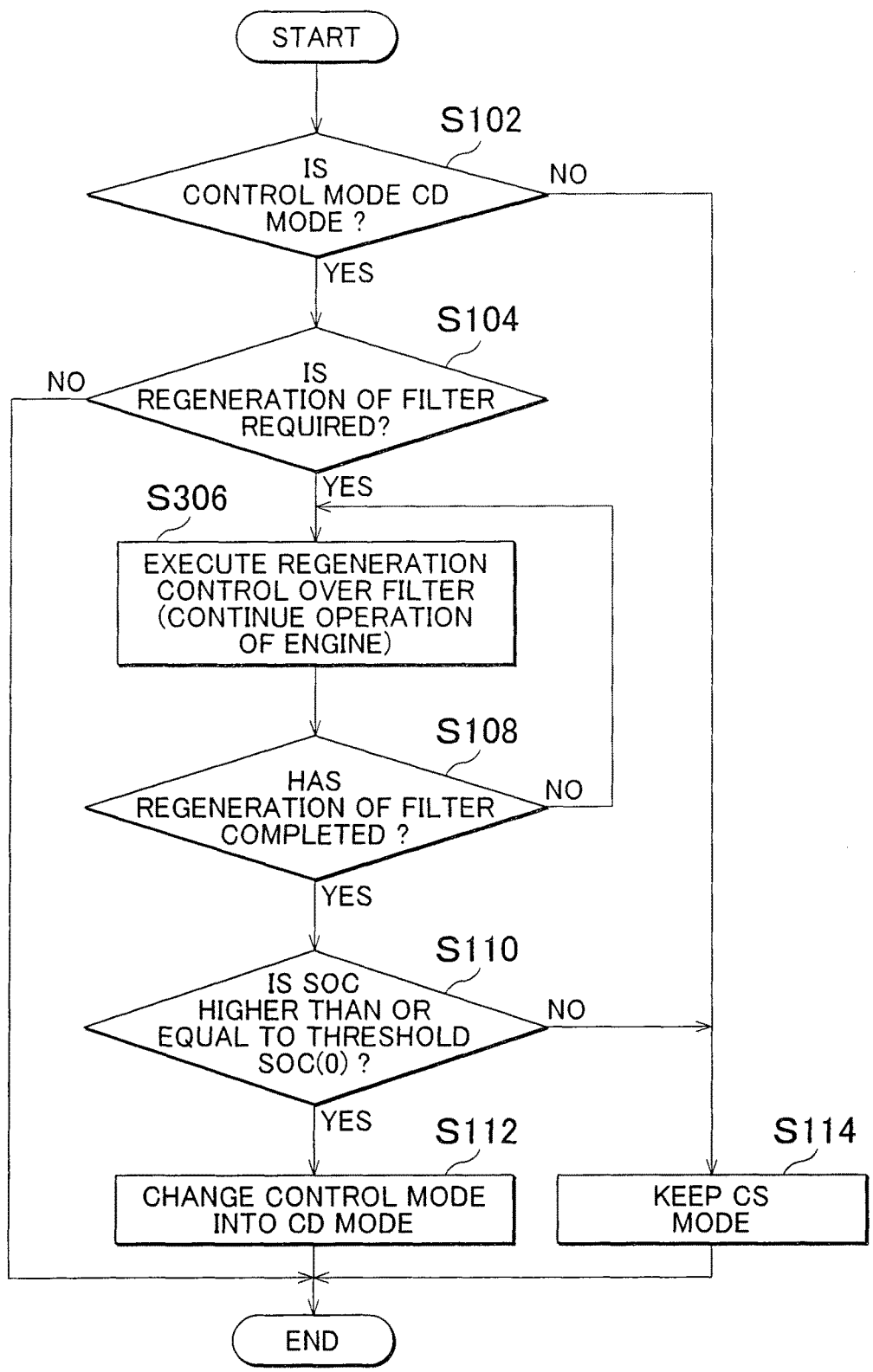
FIG. 13 is an example of a flowchart that shows a control process that is executed by the ECU when an engine is a diesel engine.

In this way, with the hybrid vehicle according to the present embodiment, in addition to the operation and advantageous effects described in the above-described embodiment, it is possible to early increase the temperature of the filter 84 by changing the control mode from the CD mode to the CS mode and executing regeneration control. Therefore, it is possible to early start regeneration of the filter 84, so it is possible to early and reliably complete regeneration of the filter 84. The invention is also applicable to a diesel engine; however, it is further effective to apply the invention to a gasoline engine as described below. When it is assumed that the engine 10 is a diesel engine, it is conceivable that the process shown in the flowchart of FIG. 13 is executed. Hereinafter, the process shown in the flowchart of FIG. 13 will be described.

The process shown in the flowchart of FIG. 13 differs from the process shown in the flowchart of FIG. 4 in that the process of S306 is executed instead of S106 in FIG. 4, and the other processes are the same. Therefore, the detailed description thereof will not be repeated.

When it is determined that regeneration of the filter is required (YES in S104), the ECU 200 executes regeneration control over the filter 84 (DPF) in S306. When regeneration control is executed over the DPF, and when the engine 10 is stopped, the engine 10 is forcibly started up, and the operation of the engine 10 is continued until regeneration of the filter 84 completes. For example, output raising control or heating control is one example of temperature increasing control in regeneration control over the DPF.

The engine 10 that is a diesel engine is larger in the amount of PM generated and lower in exhaust gas temperature than a gasoline engine having a comparable output. Particularly, during the CD mode, when the engine starts up in a state where warm-up has not been completed, the amount of PM generated increases.

Therefore, when regeneration of the filter 84 is required, it is desirable that a temporary stop of the engine according to the control mode be suppressed in order to early complete regeneration of the filter 84 and the operation of the engine 10 be continued until regeneration of the filter 84 completes as shown in the flowchart of FIG. 13.

On the other hand, a gasoline engine to which the invention is applied is smaller in the amount of PM generated and higher in exhaust gas temperature than a diesel engine having a comparable output. Therefore, even when it is determined that regeneration of the filter 84 is required, a temporary stop (intermittent operation) of the engine 10 according to the control mode is permitted. Therefore, it is more effective that the invention that changes the control mode from the CD mode to the CS mode having a larger number of opportunities for the engine 10 to operate than the CD mode in the case where regeneration of the filter 84 is required is applied to a gasoline engine.

In the present embodiments, as described with reference to FIG. 1, the hybrid vehicle on which the gasoline engine and the two motor generators, including the first MG 20 and the second MG 30, are mounted is described as an example. However, particularly, the number of motor generators mounted on the hybrid vehicle is not limited to two, and may be one or three or more. The hybrid vehicle may be a series hybrid vehicle or may be a parallel hybrid vehicle.

In the present embodiments, as illustrated in FIG. 1, the layout of the exhaust passage in which the catalyst 82 and the filter 84 are provided one by one is described as an example. Instead, the layout of an exhaust passage in which at least one of the catalyst 82 and the filter 84 is provided in two or more numbers may be employed.

Figure 14:
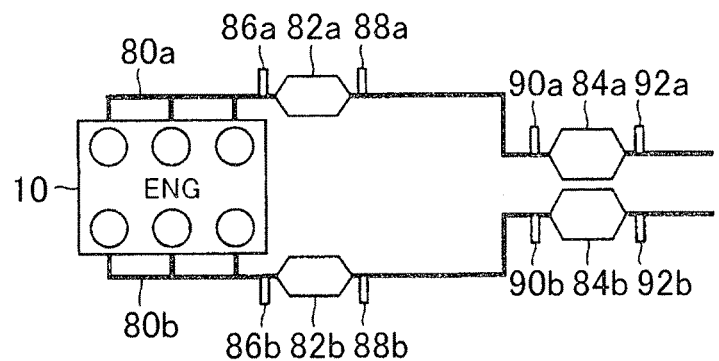
FIG. 14 is a first view that shows another example of the layout of an exhaust passage.

For example, the layout of the exhaust passage may be the layout shown in FIG. 14. That is, as shown in FIG. 14, when the engine 10 is a V-engine having cylinders in each of a first bank 10a and a second bank 10b, a first catalyst 82a and a first filter 84a may be provided in a first exhaust passage 80a coupled to the cylinders formed in the first bank 10a, and a second catalyst 82b and a second filter 84b may be provided in a second exhaust passage 80b coupled to the cylinders formed in the second bank 10b.

In this case, as shown in FIG. 14, a first air-fuel ratio sensor 86a is provided at a location upstream of the first catalyst 82a in the first exhaust passage 80a, and a first oxygen sensor 88a is provided at a location just downstream of the first catalyst 82a. A first upstream-side pressure sensor 90a is provided at a location upstream of the first filter 84a in the first exhaust passage 80a, and a first downstream-side pressure sensor 92a is provided at a location just downstream of the first filter 84a.

In addition, a second air-fuel ratio sensor 86b is provided at a location upstream of the second catalyst 82b in the second exhaust passage 80b, and a second oxygen sensor 88b is provided at a location just downstream of the second catalyst 82b. A second upstream-side pressure sensor 90b is provided at a location upstream of the second filter 84b in the second exhaust passage 80b, and a second downstream-side pressure sensor 92b is provided at a location just downstream of the second filter 84b.

In the thus configured vehicle, the ECU 200 determines whether regeneration of the first filter 84a and/or the second filter 84b is required on the basis of at least one of a first differential pressure between a first upstream-side pressure that is detected by the first upstream-side pressure sensor 90a and a first downstream-side pressure that is detected by the first downstream-side pressure sensor 92a or a second differential pressure between a second upstream-side pressure that is detected by the second upstream-side pressure sensor 90b and a second downstream-side pressure that is detected by the second downstream-side pressure sensor 92b.

The ECU 200, for example, may determine that regeneration of the first filter 84a and the second filter 84b is required when at least one of the first differential pressure or the second differential pressure is larger than a threshold. The ECU 200, for example, may determine that regeneration of the first filter 84a and the second filter 84b is required when both the first differential pressure and the second differential pressure are larger than a threshold. The ECU 200, for example, may determine that regeneration of the first filter 84a is required when the first differential pressure is larger than a threshold, and may determine that regeneration of the second filter 84b is required when the second differential pressure is larger than a threshold.

The ECU 200 may execute regeneration control over at least any one of the first filter 84a or the second filter 84b, of which regeneration is required, or may execute regeneration control over both the first filter 84a and the second filter 84b.

The ECU 200, for example, may execute regeneration control over only the first bank 10a in order to increase the temperature of the first filter 84a when it is determined that regeneration of only the first filter 84a is required, and may execute regeneration control over only the second bank 10b in order to increase the temperature of the second filter 84b when it is determined that regeneration of only the second filter 84b is required.

Figure 15:
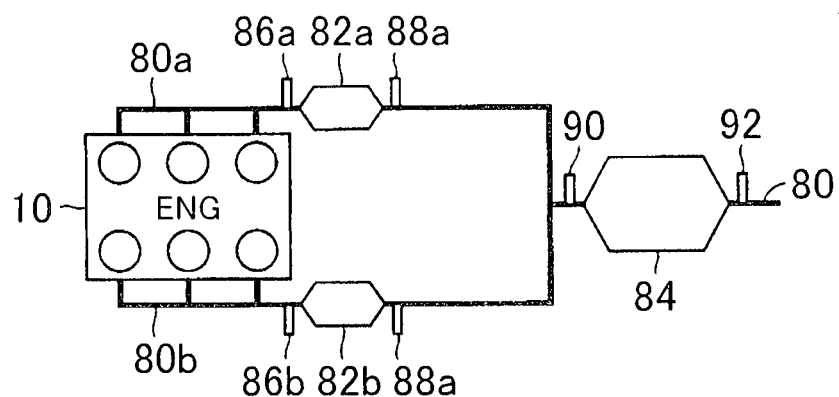
FIG. 15 is a second view that shows another example of the layout of the exhaust passage.

Alternatively, the layout of the exhaust passage may be the layout shown in FIG. 15. That is, as in the case of the layout of the exhaust passage shown in FIG. 14, the first catalyst 82a, the first air-fuel ratio sensor 86a and the first oxygen sensor 88a may be provided in the first exhaust passage 80a coupled to the cylinders of the first bank 10a of the engine 10 that is a V-engine having a plurality of banks, the second catalyst 82b, the second air-fuel ratio sensor 86b and the second oxygen sensor 88b may be provided in the second exhaust passage 80b coupled to the cylinders of the second bank 10b, and the filter 84 may be provided in a third exhaust passage 80c of which one end is coupled to a location at which the first exhaust passage 80a and the second exhaust passage 80b are collected.

In this case, as shown in FIG. 15, the upstream-side pressure sensor 90 is provided at a location upstream of the filter 84 in the third exhaust passage 80c, and the downstream-side pressure sensor 92 is provided at a location downstream of the filter 84 in the third exhaust passage 80c. A method of determining whether regeneration of the filter 84 is required and regeneration control in this case are similar to the method of determining whether regeneration of the filter 84 is required and regeneration control that are described with reference to FIG. 1, so the detailed description thereof will not be repeated.

Figure 16:
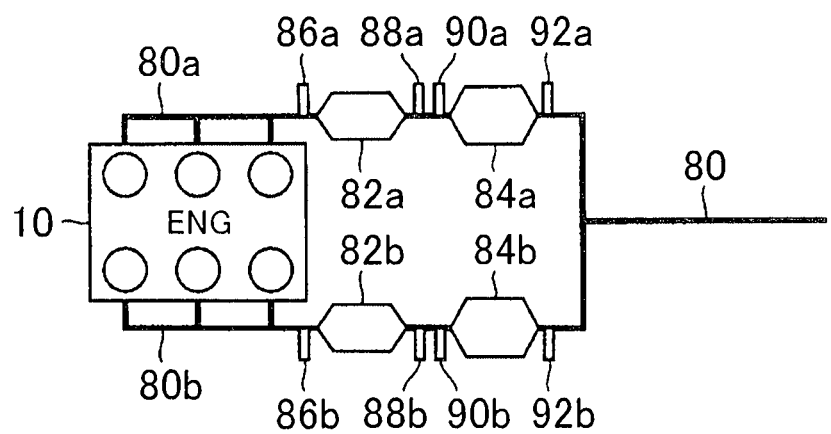
FIG. 16 is a third view that shows another example of the layout of the exhaust passage.

Alternatively, the layout of the exhaust passage may be the layout shown in FIG. 16. That is, as in the case of the layout of the exhaust passage shown in FIG. 14, the first catalyst 82a, the first air-fuel ratio sensor 86a, the first oxygen sensor 88a, the first filter 84a, the first upstream-side pressure sensor 90a and the first downstream-side pressure sensor 92a may be provided in the first exhaust passage 80a coupled to the cylinders of the first bank 10a of the engine 10 that is a V-engine, the second catalyst 82b, the second air-fuel ratio sensor 86b, the second oxygen sensor 88b, the second filter 84b, the second upstream-side pressure sensor 90b and the second downstream-side pressure sensor 92b may be provided in the second exhaust passage 80b coupled to the cylinders of the second bank 10b, and one end of the third exhaust passage 80c is coupled to a location at which the first exhaust passage 80a and the second exhaust passage 80b are collected.

A method of determining whether regeneration of the filters 84a, 84b is required and regeneration control in this case are similar to the method of determining whether regeneration of the filters 84a, 84b is required and regeneration control that are described with reference to FIG. 14, so the detailed description thereof will not be repeated.

The embodiments described above should be regarded as only illustrative in every respect and not restrictive. The scope of the invention is defined by the appended claims rather than the description of the above embodiments. The scope of the invention is intended to encompass all modifications within the scope of the appended claims and equivalents thereof.

The invention claimed is:

1. A hybrid vehicle comprising:
   an engine including an exhaust passage;
   a rotary electric machine that is a driving source of the hybrid vehicle;
   a filter configured to trap particulate matter flowing through the exhaust passage; and
   an electronic control unit configured to
   control the hybrid vehicle in any one of a plurality of control modes, the plurality of control modes including a charge depleting mode and a charge sustaining mode, the number of opportunities for the engine to operate when the control mode is the charge sustaining mode being larger than the number of opportunities for the engine to operate when the control mode is the charge depleting mode,
   control the hybrid vehicle in the charge sustaining mode when the filter is regenerated, and
   when the charge sustaining mode has been selected before the regeneration of the filter is required, keep the charge sustaining mode during the regeneration of the filter until regeneration of the filter is complete.

2. The hybrid vehicle according to claim 1, wherein
   the electronic control unit is configured to change the control mode of the hybrid vehicle from the charge depleting mode to the charge sustaining mode when the control mode is the charge depleting mode and when the filter is regenerated.

3. The hybrid vehicle according to claim 2, wherein
   the electronic control unit is configured to change the control mode from the charge sustaining mode to the charge depleting mode after regeneration of the filter has completed when the filter is regenerated and when the control mode is changed into the charge sustaining mode.

4. The hybrid vehicle according to claim 2, further comprising:
   an electrical storage device configured to be charged by using a power of the engine, wherein
   the electronic control unit is configured to
   change the control mode from the charge sustaining mode to the charge depleting mode when regeneration of the filter completes and when a state of charge of the electrical storage device is higher than or equal to a predetermined value, and
   keep the charge sustaining mode when regeneration of the filter completes and when the state of charge is lower than the predetermined value.

5. The hybrid vehicle according to claim 2, wherein
   the electronic control unit is configured to change the control mode from the charge depleting mode to the charge sustaining mode after the engine has been started up when the control mode is the charge depleting mode and when regeneration of the filter is required.

6. The hybrid vehicle according to claim 2, wherein
   the electronic control unit is configured to
   start up the engine when the control mode is the charge depleting mode and when a power of the hybrid vehicle exceeds a first start-up threshold, and
   start up the engine when the control mode is the charge sustaining mode and when the power of the hybrid vehicle exceeds a second start-up threshold, the second start-up threshold being a value lower than the first start-up threshold.

7. The hybrid vehicle according to claim 2, wherein
   the electronic control unit is configured to
   start up the engine when the control mode is the charge depleting mode and when a speed of the vehicle exceeds a third start-up threshold, and
   start up the engine when the control mode is the charge sustaining mode and when the speed of the vehicle exceeds a fourth start-up threshold, the fourth start-up threshold being a value lower than the third start-up threshold.

8. The hybrid vehicle according to claim 1, wherein
   the engine is a gasoline engine.

9. The hybrid vehicle according to claim 1,
   wherein the electronic control unit is configured to start up the engine when the control mode is the charge depleting mode and when a power of the hybrid vehicle exceeds a first start-up threshold, and start up the engine when the control mode is the charge sustaining mode and when the power of the hybrid vehicle exceeds a second start-up threshold, and wherein the second start-up threshold is a value lower than the first start-up threshold, such that the number of opportunities for the engine to operate when the control mode is the charge sustaining mode are larger than the number of opportunities for the engine to operate when the control mode is the charge depleting mode.

10. A control method for a hybrid vehicle, the hybrid vehicle including an engine, a rotary electric machine, a filter and an electronic control unit, the engine including an exhaust passage, the rotary electric machine being a driving source of the hybrid vehicle, the filter being configured to trap particulate matter flowing through the exhaust passage, the control method comprising:

controlling, by the electronic control unit, the hybrid vehicle in any one of a plurality of control modes, the plurality of control modes including a charge depleting mode and a charge sustaining mode, the number of opportunities for the engine to operate when the control mode is the charge sustaining mode being larger than the number of opportunities for the engine to operate when the control mode is the charge depleting mode, controlling, by the electronic control unit, the hybrid vehicle in the charge sustaining mode when the filter is regenerated, and when the charge sustaining mode has been selected before the regeneration of the filter is required, controlling, by the electronic control unit, the hybrid vehicle to keep the charge sustaining mode during the regeneration of the filter until regeneration of the filter is complete.

* * * * *